United States Patent
Hu et al.

(10) Patent No.: US 12,452,006 B2
(45) Date of Patent: Oct. 21, 2025

(54) GLOBAL CSD INDEX ASSIGNMENT FOR DISTRIBUTED-TONE RESOURCE UNIT TRANSMISSIONS

(71) Applicant: MediaTek Singapore Pte. Ltd., Singapore (SG)

(72) Inventors: Shengquan Hu, San Jose, CA (US); Jianhan Liu, San Jose, CA (US); Thomas Edward Pare, Jr., San Jose, CA (US)

(73) Assignee: MediaTek Singapore Pte. Ltd., Singapore (SG)

( * ) Notice: Subject to any disclaimer, the term of this patent is extended or adjusted under 35 U.S.C. 154(b) by 222 days.

(21) Appl. No.: 17/946,021

(22) Filed: Sep. 15, 2022

(65) Prior Publication Data

US 2023/0089003 A1 Mar. 23, 2023

Related U.S. Application Data

(60) Provisional application No. 63/281,756, filed on Nov. 22, 2021, provisional application No. 63/276,811, filed on Nov. 8, 2021, provisional application No. 63/275,975, filed on Nov. 5, 2021, provisional application No. 63/274,568, filed on Nov. 2, 2021, provisional application No. 63/272,347, filed on Oct.
(Continued)

(51) Int. Cl.
*H04L 5/00* (2006.01)

(52) U.S. Cl.
CPC ............ *H04L 5/0023* (2013.01); *H04L 5/005* (2013.01)

(58) Field of Classification Search
None
See application file for complete search history.

(56) References Cited

U.S. PATENT DOCUMENTS

| | | |
|---|---|---|
| 2017/0048882 A1 | 2/2017 | Li et al. |
| 2020/0014509 A1 | 1/2020 | Asterjadhi et al. |
| 2021/0143955 A1 | 5/2021 | Yang et al. |

(Continued)

FOREIGN PATENT DOCUMENTS

| | | |
|---|---|---|
| CN | 107005523 A | 8/2017 |
| CN | 113037448 A | 6/2021 |

(Continued)

OTHER PUBLICATIONS

How Does an 802.11ax AP Allocate Resource Units? (Year: 2021).*
(Continued)

*Primary Examiner* — Luna Weissberger
(74) *Attorney, Agent, or Firm* — Andy M. Han; Han IP PLLC

(57) ABSTRACT

Various schemes pertaining to global cyclic shift delay (CSD) assignment for distributed-tone resource unit (dRU) transmissions in wireless communications are described. An apparatus applies a CSD index assignment in distributing a plurality of subcarriers of a resource unit (RU) over a bandwidth to generate an extremely-high-throughput short training field (EHT-STF) of a dRU. The apparatus then transmits symbols of the EHT-STF of the dRU. The CSD index assignment is based on a dRU hierarchical structure with one or more CSD indexes shared among multiple dRUs of different sizes but not among multiple dRUs of a same size.

2 Claims, 41 Drawing Sheets

Related U.S. Application Data

27, 2021, provisional application No. 63/246,830, filed on Sep. 22, 2021.

(56) References Cited

U.S. PATENT DOCUMENTS

2023/0048884 A1* 2/2023 Yang .................. H04L 5/0041
2023/0069075 A1* 3/2023 Yang .................. H04W 52/18

FOREIGN PATENT DOCUMENTS

| EP | 2293507 A2 | 3/2011 |
| EP | 2293507 A3 | 4/2013 |
| WO | WO 2011040789 A2 | 4/2011 |

OTHER PUBLICATIONS

European Patent Office, Extended European Search Report for European Patent Application No. 22184989.6, Dec. 20, 2022.
"27. High-efficiency (HE) PHY specification(11ax) 27.1 Introduction 27.1.1 Introduction to the HE PHY", IEEE Draft; REVME_CL_27.FM, IEEE-SA, Piscataway, NJ USA, No. D0.1, Jun. 29, 2021 (Jun. 29, 2021), pp. 1-297.
China National Intellectual Property Administration, First Office Action in China Patent Application No. 202211161230.7, Mar. 17, 2025.
3GPP, "Younsun's Session Notes RAN1#104bis-e (Rel-17 8.1 feNR-MIMO) eom", Apr. 21, 2021.

* cited by examiner

300

| PER-dRU CSD STARTING INDEX FOR BW20, MAXNSS = 8 | | | | | | | |
|---|---|---|---|---|---|---|---|
| dRU26 | 1 | 2 | 3 | 4 | 5 | 6 | 7 | 8 |
| dRU52 | 1 | | 3 | | 5 | | 7 | |
| dRU106 | 1 | | | | 5 | | | |

| PER-dRU CSD STARTING INDEX FOR BW40, MAXNSS = 8 | | | | | | | |
|---|---|---|---|---|---|---|---|
| dRU26 | 1 | 2 | 3 | 4 | 5 | 6 | 7 | 8 |
| dRU52 | 1 | | 3 | | 5 | | 7 | |
| dRU106 | 1 | | | | 5 | | | |
| dRU242 | 1 | | | | | | | |

| PER-dRU CSD STARTING INDEX FOR BW80, MAXNSS = 8 | | | | | | | |
|---|---|---|---|---|---|---|---|
| dRU52 | 1 | 2 | 3 | 4 | 5 | 6 | 7 | 8 |
| dRU106 | 1 | | 3 | | 5 | | 7 | |
| dRU242 | 1 | | | | 5 | | | |
| dRU484 | 1 | | | | | | | |

PER-dRU CSD STARTING INDEX FOR BW20, MAXNSS = 16

| | | | | | | | | |
|---|---|---|---|---|---|---|---|---|
| dRU26 | 1 | 3 | 5 | 7 | 9 | 11 | 13 | 15 |
| dRU52 | 1 | | 5 | | 9 | | 13 | |
| dRU106 | 1 | | | | 9 | | | |

PER-dRU CSD STARTING INDEX FOR BW40, MAXNSS = 16

| | | | | | | | | | | | | | | | | |
|---|---|---|---|---|---|---|---|---|---|---|---|---|---|---|---|---|
| dRU26 | 1 | 2 | 3 | 4 | 5 | 6 | 7 | 8 | 9 | 10 | 11 | 12 | 13 | 14 | 15 | 16 |
| dRU52 | 1 | | 3 | | 5 | | 7 | | 9 | | 11 | | 13 | | 15 | |
| dRU106 | 1 | | | | 5 | | | | 9 | | | | 13 | | | |
| dRU242 | 1 | | | | | | | | 9 | | | | | | | |

PER-dRU CSD STARTING INDEX FOR BW80, MAXNSS = 16

| | | | | | | | | | | | | | | | | |
|---|---|---|---|---|---|---|---|---|---|---|---|---|---|---|---|---|
| dRU52 | 1 | 2 | 3 | 4 | 5 | 6 | 7 | 8 | 9 | 10 | 11 | 12 | 13 | 14 | 15 | 16 |
| dRU106 | 1 | | 3 | | 5 | | 7 | | 9 | | 11 | | 13 | | 15 | |
| dRU242 | 1 | | | | 5 | | | | 9 | | | | 13 | | | |
| dRU484 | 1 | | | | | | | | 9 | | | | | | | |

800 ─▶ dRU LOGICAL INDEX AND HIERARCHICAL STRUCTURE FOR dRU ON BW20 (AND SIMILARLY FOR BW40 AND BW80)

| dRU26_1 | dRU26_2 | dRU26_3 | dRU26_4 | dRU26_5 | dRU26_6 | dRU26_7 | dRU26_8 | dRU26_9 |
|---|---|---|---|---|---|---|---|---|
| dRU52_1 | | dRU52_2 | | | dRU52_3 | | dRU52_4 | |
| dRU106_1 | | | | | dRU106_2 | | | |

CSD STARTING INDEX FOR 26-TONE dRU_1 ← 
CSD STARTING INDEX FOR 26-TONE dRU_5
CSD STARTING INDEX FOR 52-TONE dRU_4
CSD STARTING INDEX FOR 106-TONE dRU_2

(k)

| dRU26 | 1 | 2 | 3 | 4 | 4 | 5 | 6 | 7 | 8 |
|---|---|---|---|---|---|---|---|---|---|
| dRU52 | 1 | | 3 | | | 5 | | 7 | |
| dRU106 | 2 | | | | | 7 | | | |

(l)

| dRU26 | 1 | 2 | 3 | 4 | 4 | 5 | 6 | 7 | 8 |
|---|---|---|---|---|---|---|---|---|---|
| dRU52 | 1 | | 3 | | | 5 | | 7 | |
| dRU106 | 2 | | | | | 6 | | | |

| | 1 | 2 | 3 | 4 | 5 | 6 | 7 | 8 |
|---|---|---|---|---|---|---|---|---|
| dRU26 | 1 | | 3 | 4 or 5 | 5 | 6 | 7 | 8 |
| dRU52 | 1 | | 3 | | 5 | | 7 | |
| dRU106 | 1 | 2 | | 4 | | 6 | | 8 |
| dRU242 | 1 | | | | 6 | | | |

900 ←

(b)

| | 1 | 2 | 3 | 4 | 5 | 6 | 7 | 8 |
|---|---|---|---|---|---|---|---|---|
| dRU26 | 1 | 2 | 3 | 4 | 5 | 6 | 7 | 8 |
| dRU52 | 1 | | 3 | 4 | 5 | 6 | 7 | 8 |
| dRU106 | | 3 | | | | | 7 | |
| dRU242 | | 2 | | | 6 | | | |

(c)

CSD STARTING INDEX FOR 26-TONE dRU_18
CSD STARTING INDEX FOR 52-TONE dRU_8
CSD STARTING INDEX FOR 106-TONE dRU_4

| | 1 | 2 | 3 | 4 | 5 | 6 | 7 | 8 |
|---|---|---|---|---|---|---|---|---|
| dRU26 | 1 | 2 | 3 | 4 or 5 | 5 | 6 | 7 | 8 |
| dRU52 | 1 | 2 | 3 | 4 | 5 or 4 | 6 | 7 | 8 |
| dRU106 | 3 | | | | | | 7 | |
| dRU242 | | 2 | | | 6 | | | |

CSD STARTING INDEX FOR 242-TONE dRU_2

(d)

| | 1 | 2 | 3 | 4 | 5 | 6 | 7 | 8 |
|---|---|---|---|---|---|---|---|---|
| dRU26 | 1 | 2 | 3 | 4 | 5 | 6 | 7 | 8 |
| dRU52 | 1 | 2 | 3 | 4 | 5 | 6 | 7 | 8 |
| dRU106 | 2 | | | 4 | | 6 | | 8 |
| dRU242 | | | 3 | | | 6 | | |

(e)

| | 1 | 2 | 3 | 4 | 5 | 6 | 7 | 8 |
|---|---|---|---|---|---|---|---|---|
| dRU26 | 1 | 1 or 2 | 3 or 4 | 3 or 4 | 5 or 6 | 5 or 6 | 7 or 8 | 7 or 8 |
| dRU52 | 1 or 2 | 1 or 2 | 3 or 4 | 4 or 5 | 5 or 6 | 5 or 6 | 7 or 8 | 7 or 8 |
| dRU106 | 1 or 2 or 3 or 4 | | | | 5 or 6 or 7 or 8 | | | |
| dRU242 | 1 or 2 or 3 or 4 | | | | 5 or 6 or 7 or 8 | | | |

FIG. 11

(a)
| | 1 | 2 | 3 | 4 | 5 | 6 | 7 | 8 |
|---|---|---|---|---|---|---|---|---|
| dRU52 | 1 | | 3 | | 5 | | 7 | |
| dRU106 | | 1 | | 3 | | 5 | | 7 |
| dRU242 | 1 | | | 2 | | | 6 | |
| dRU484 | | | | | 6 | | | 8 |

(b)
| | 1 | 2 | 3 | 4 | 5 | 6 | 7 | 8 |
|---|---|---|---|---|---|---|---|---|
| dRU52 | 1 | | 3 | | 5 | | 7 | |
| dRU106 | | 1 | | 3 | | 5 | | 7 |
| dRU242 | 3 | | | 4 | | | 6 | |
| dRU484 | | | | | 6 | | | 8 |

(c) CSD STARTING INDEX FOR 52-TONE dRU_1 / CSD STARTING INDEX FOR 106-TONE dRU_8 / CSD STARTING INDEX FOR 242-TONE dRU_4 / CSD STARTING INDEX FOR 484-TONE dRU_2
| | 1 | 2 | 3 | 4 | 5 | 6 | 7 | 8 |
|---|---|---|---|---|---|---|---|---|
| dRU52 | 1 | | 4 | | 5 | | 7 | 8 |
| dRU106 | | 2 | | 3 | | 6 | 7 | |
| dRU242 | | | | | | | | 7 |
| dRU484 | 5 | | | | | | | |

(d)
| | 1 | 2 | 3 | 4 | 5 | 6 | 7 | 8 |
|---|---|---|---|---|---|---|---|---|
| dRU52 | 1 | | 3 | | 5 | | 7 | |
| dRU106 | | 2 | | 4 | | 6 | | 8 |
| dRU242 | | | | | | | | |
| dRU484 | | | | | 6 | | | |

(e)
| | 1 | 2 | 3 | 4 | 5 | 6 | 7 | 8 |
|---|---|---|---|---|---|---|---|---|
| dRU52 | 1 or 2 | | 3 or 4 | | 5 or 6 | | 7 or 8 | |
| dRU106 | 1 or 2 | | 3 or 4 | | 5 or 6 | | 7 or 8 | |
| dRU242 | 1 or 2 or 3 or 4 | | | | 5 or 6 or 7 or 8 | | | |
| dRU484 | 1 or 2 or 3 or 4 or 5 or 6 or 7 or 8 | | | | | | | |

| | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| dRU52 | 1 | | 3 | | 5 | | 7 | | 9 | | 11 | | 13 | | 15 | |
| dRU106 | 1 | | 3 | | 5 | | | | 9 | | 11 | | 13 | | | |
| dRU242 | 1 | | | | 5 | | | | 9 | | | | 13 | | | |
| dRU484 | 1 | | | | | | | | 9 | | | | | | | |

(b)

| | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| dRU52 | 1 | | 3 | | 5 | | 7 | | 9 | | 11 | | 13 | | 15 | |
| dRU106 | 1 | | 3 | | 5 | | | | 9 | | 11 | | 13 | | 15 | |
| dRU242 | 3 | | | | 5 or 7 | | | | 11 | | | | | | 15 | |
| dRU484 | 5 or 7 | | | | | | | | | | 11 or 13 | | | | | |

(c)

| | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| dRU52 | 1 | | 3 | | 5 | | 7 | | 9 | | 11 | | 13 | | 15 | |
| dRU106 | 1 | | 3 | | 5 | | | | 9 | | 11 | | 13 | | | |
| dRU242 | 3 | | | | 5 | | | | 11 | | | | 13 | | | |
| dRU484 | 3 or 5 | | | | | | | | 9 or 11 | | | | | | | |

(d)

| | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| dRU52 | 1 | | 3 | | 5 | | 7 | | 9 | | 11 | | 13 | | 15 | |
| dRU106 | 1 | | 3 | | 5 | | | | 9 | | 11 | | 13 | | 15 | |
| dRU242 | 3 | | | | 7 | | | | 11 | | | | | | 15 | |
| dRU484 | 3 or 5 or 7 | | | | | | | | 9 or 11 or 13 | | | | | | | |

(e)

| | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| dRU52 | 1 | | 3 | | 5 | | 7 | | 9 | | 11 | | 13 | | 15 | |
| dRU106 | 1 or 2 | | 3 or 4 | | 5 or 6 | | 7 or 8 | | 9 or 10 | | 11 or 12 | | 13 or 14 | | 15 or 16 | |
| dRU242 | 1 or 2 or 3 or 4 | | | | 5 or 6 or 7 or 8 | | | | 9 or 10 or 11 or 12 | | | | 13 or 14 or 15 or 16 | | | |
| dRU484 | 1 or 2 or 3 or 4 or 5 or 6 or 7 or 8 | | | | | | | | 9 or 10 or 11 or 12 or 13 or 14 or 15 or 16 | | | | | | | |

| x1 | x2 | x3 | x4 | x5 | x6 | x7 | x8 | x9 |
|----|----|----|----|----|----|----|----|----|
| x1 or x2 | | x3 or x4 | | | x6 or x7 | | x8 or x9 | |
| x1 or x2 or x3 or x4 | | | | | x6 or x7 or x8 or x9 | | | |

- x1:1:8
- x2:1:8 except x1
- x3:1:8 except x1, x2

→ THIS ROW CORRESPONDS TO 9 dRU26
→ THIS ROW CORRESPONDS TO 4 dRU52
→ THIS ROW CORRESPONDS TO 2 dRU106

(ASSUMING 8 CSD VALUES ARE AVAILABLE FOR GLOBAL CSD INDEX ASSIGNMENT)

(B) BW40

| x1 | x2 | x3 | x4 | x5 | x6 | x7 | x8 | x9 | y1 | y2 | y3 | y4 | y5 | y6 | y7 | y8 | y9 |
|----|----|----|----|----|----|----|----|----|----|----|----|----|----|----|----|----|----|
| x1 or x2 | | x3 or x4 | | | x6 or x7 | | x8 or x9 | | y1 or y2 | | y3 or y4 | | | y6 or y7 | | y8 or y9 | |
| x1 or x2 or x3 or x4 | | | | | x6 or x7 or x8 or x9 | | | | y1 or y2 or y3 or y4 or y5 or y6 or y7 or y8 or y9 | | | | | | | | |

- y1:1:8
- y2:1:8 except y1
- y3:1:8 except y1, y2

Option-1

| | 1 | 2 | 3 | 4 | | 5 | 6 | 7 | 8 |
|---|---|---|---|---|---|---|---|---|---|
| dRU26 | 1 | | 3 | 4 | | 5 | | 7 | |
| dRU52 | | | | | 4 | | 5 | | |
| dRU106 | | 1 | | | | | 6 | | |

Option-2

| | 1 | 2 | 3 | 4 | | 5 | 6 | 7 | 8 |
|---|---|---|---|---|---|---|---|---|---|
| dRU26 | 1 | 2 | 3 | 4 | | 5 | 6 | 7 | 8 |
| dRU52 | | 2 | | 4 | 5 | | 6 | | 8 |
| dRU106 | | | 3 | | | | | 7 | |

Option-3

| | 1 | 2 | 3 | 4 | 5 | | 3 | 6 | 7 | 8 |
|---|---|---|---|---|---|---|---|---|---|---|
| dRU26 | 1 | 2 | | 4 | 5 | | | 6 | 7 | 8 |
| dRU52 | | 2 | | 4 | | | | 6 | | |
| dRU106 | | | 4 | | | | | | 7 | |

Option-4

| | 1 | | 4 | 5 | | 8 | 2 | 3 | 6 | 7 |
|---|---|---|---|---|---|---|---|---|---|---|
| dRU26 | 1 | 4 | | 5 | | 8 | 2 | 3 | 6 | 7 |
| dRU52 | 1 | | | | 4 | | | | | 7 |
| dRU106 | | | | 1 | | | | 3 | | |

With Collisions

| | Total number of a CSD index not used | total number of NO collision | Total number of 2-CSD index overlap | Total number of 3-CSD index overlap | total number of ALL collisions |
|---|---|---|---|---|---|
| Option-1 | 65 | 223 | 94 | 18 | 112 |
| Option-2 | 63 | 227 | 92 | 18 | 110 |
| Option-3 | 61 | 231 | 90 | 18 | 108 |
| Option-4 | 63 | 227 | 92 | 18 | 110 |

FIG. 20

With Collisions

| | Total number of a CSD index not used | total number of NO collision | Total number of 2-CSD index overlap | Total number of 3-CSD index overlap | Total number of 4-CSD index overlap | Total number of 5-CSD index overlap | total number of ALL collisions |
|---|---|---|---|---|---|---|---|
| Option-1 | 385 | 2877 | 3343 | 2431 | 1420 | 360 | 7554 |
| Option-2 | 264 | 2982 | 3466 | 2394 | 1310 | 400 | 7570 |
| Option-3 | 286 | 2912 | 3480 | 2448 | 1330 | 360 | 7618 |

| BW20 | | | | | | | | |
|---|---|---|---|---|---|---|---|---|
| dRU26 | 1 | 2 | 3 | 4 | 5 | 6 | 7 | 8 |
| dRU52 | 1 | | 3 | | 5 | | 7 | |
| dRU106 | 1 | | | | 6 | | | |

This row corresponds to 9 dRU26
This row corresponds to 4 dRU52
This row corresponds to 2 dRU106

| BW40 | | | | | | | | |
|---|---|---|---|---|---|---|---|---|
| dRU26 | 1 | 2 | 3 | 4 | 5 | 6 | 7 | 8 |
| dRU52 | 1 | | 3 | | 5 | | 7 | |
| dRU106 | 1 | | 2 | | 4 | | 6 | |
| dRU242 | 1 | | | | 6 | | | |

| BW80 | | | | | | | | |
|---|---|---|---|---|---|---|---|---|
| dRU52 | 1 | 2 | 3 | 4 | 5 | 6 | 7 | 8 |
| dRU106 | 1 | | 3 | | 5 | | 7 | |
| dRU242 | 1 | | 2 | | 4 | | 6 | |
| dRU484 | 1 | | | | 6 | | | |

FIG. 26

| dRU size | Global CSD starting index for BW20 |
|---|---|
| dRU26, i=1:9 | {1,2,3,4,4,5,6,7,8} |
| dRU52, i=1:4 | {1,3,5,7} |
| dRU106, i=1:2 | {1,6} |

| dRU size | Global CSD starting index for BW40 |
|---|---|
| dRU26, i=1:18 | {1, 2, 3, 4, 1, 5, 6, 7, 8, 1, 2, 3, 4, 4, 5, 6, 7, 8} |
| dRU52, i=1:8 | {1, 3, 5, 7, 2, 4, 6, 8} |
| dRU106, i=1:4 | {1,5,2,6} |
| dRU242, i=1:2 | {1,6} |

| dRU size | Global CSD starting index for BW80 |
|---|---|
| dRU52, i=1:16 | {1, 2, 3, 4, 5, 6, 7, 8, 1, 2, 3, 4, 5, 6, 7, 8} |
| dRU106, i=1:8 | {1, 3, 5, 7, 2, 4, 6, 8} |
| dRU242, i=1:4 | {1,5,2,6} |
| dRU484, i=1:2 | {1,6} |

| dRU size | Global CSD starting index for BW20 |
|---|---|
| dRU26, i=1:9 | {1,4,5,8,4,2,3,6,7} |
| dRU52, i=1:4 | {1,5,3,7} |
| dRU106, i=1:2 | {1,7} |

| dRU size | Global CSD starting index for BW40 |
|---|---|
| dRU26, i=1:18 | {1,2,3,4,2,5,6,7,8,1,2,3,4,6,5,6,7,8} |
| dRU52, i=1:8 | {1,4,5,8,2,3,6,7} |
| dRU106, i=1:4 | {1,5,3,7} |
| dRU242, i=1:2 | {1,7} |

| dRU size | Global CSD starting index for BW80 |
|---|---|
| dRU52, i=1:16 | {1,2,3,4,5,6,7,8,1,2,3,4,5,6,7,8} |
| dRU106, i=1:8 | {1,4,5,8,2,3,6,7} |
| dRU242, i=1:4 | {1,5,3,7} |
| dRU484, i=1:2 | {1,7} |

| dRU size | Global CSD starting index for BW20 |
|---|---|
| dRU26, i=1:9 | {1,2,3,4,5,5,6,7,8} |
| dRU52, i=1:4 | {2,4,6,8} |
| dRU106, i=1:2 | {3,7} |

| dRU size | Global CSD starting index for BW40 |
|---|---|
| dRU26, i=1:18 | {1,5,2,6,3,3,7,4,8,1,5,2,6,7,3,7,4,8} |
| dRU52, i=1:8 | {1,2,3,4,5,6,7,8} |
| dRU106, i=1:4 | {2,4,6,8} |
| dRU242, i=1:2 | {3,7} |

| dRU size | Global CSD starting index for BW80 |
|---|---|
| dRU52, i=1:16 | {1,5,2,6,3,7,4,8,1,5,2,6,3,7,4,8} |
| dRU106, i=1:8 | {1,2,3,4,5,6,7,8} |
| dRU242, i=1:4 | {2,4,6,8} |
| dRU484, i=1:2 | {3,7} |

| | |
|---|---|
| {[1 2 3 4 x 5 6 7 8] [1 3 5 7] [1 2]} | {[1 2 3 4 x 5 6 7 8] [2 4 6 8] [1 2]} |
| {[1 2 3 4 x 5 6 7 8] [1 3 5 7] [1 3]} | {[1 2 3 4 x 5 6 7 8] [2 4 6 8] [1 3]} |
| {[1 2 3 4 x 5 6 7 8] [1 3 5 7] [1 4]} | {[1 2 3 4 x 5 6 7 8] [2 4 6 8] [1 4]} |
| {[1 2 3 4 x 5 6 7 8] [1 3 5 7] [1 5]} | {[1 2 3 4 x 5 6 7 8] [2 4 6 8] [1 5]} |
| {[1 2 3 4 x 5 6 7 8] [1 3 5 7] [1 6]} | {[1 2 3 4 x 5 6 7 8] [2 4 6 8] [1 6]} |
| {[1 2 3 4 x 5 6 7 8] [1 3 5 7] [1 7]} | {[1 2 3 4 x 5 6 7 8] [2 4 6 8] [1 7]} |
| {[1 2 3 4 x 5 6 7 8] [1 3 5 7] [1 8]} | {[1 2 3 4 x 5 6 7 8] [2 4 6 8] [1 8]} |
| {[1 2 3 4 x 5 6 7 8] [1 3 5 7] [2 1]} | {[1 2 3 4 x 5 6 7 8] [2 4 6 8] [2 1]} |
| {[1 2 3 4 x 5 6 7 8] [1 3 5 7] [2 3]} | {[1 2 3 4 x 5 6 7 8] [2 4 6 8] [2 3]} |
| {[1 2 3 4 x 5 6 7 8] [1 3 5 7] [2 4]} | {[1 2 3 4 x 5 6 7 8] [2 4 6 8] [2 4]} |
| {[1 2 3 4 x 5 6 7 8] [1 3 5 7] [2 5]} | {[1 2 3 4 x 5 6 7 8] [2 4 6 8] [2 5]} |
| {[1 2 3 4 x 5 6 7 8] [1 3 5 7] [2 6]} | {[1 2 3 4 x 5 6 7 8] [2 4 6 8] [2 6]} |
| {[1 2 3 4 x 5 6 7 8] [1 3 5 7] [2 7]} | {[1 2 3 4 x 5 6 7 8] [2 4 6 8] [2 7]} |
| {[1 2 3 4 x 5 6 7 8] [1 3 5 7] [2 8]} | {[1 2 3 4 x 5 6 7 8] [2 4 6 8] [2 8]} |
| {[1 2 3 4 x 5 6 7 8] [1 3 5 7] [3 1]} | {[1 2 3 4 x 5 6 7 8] [2 4 6 8] [3 1]} |
| {[1 2 3 4 x 5 6 7 8] [1 3 5 7] [3 2]} | {[1 2 3 4 x 5 6 7 8] [2 4 6 8] [3 2]} |
| {[1 2 3 4 x 5 6 7 8] [1 3 5 7] [3 4]} | {[1 2 3 4 x 5 6 7 8] [2 4 6 8] [3 4]} |
| {[1 2 3 4 x 5 6 7 8] [1 3 5 7] [3 5]} | {[1 2 3 4 x 5 6 7 8] [2 4 6 8] [3 5]} |
| {[1 2 3 4 x 5 6 7 8] [1 3 5 7] [3 6]} | {[1 2 3 4 x 5 6 7 8] [2 4 6 8] [3 6]} |
| {[1 2 3 4 x 5 6 7 8] [1 3 5 7] [3 7]} | {[1 2 3 4 x 5 6 7 8] [2 4 6 8] [3 7]} |
| {[1 2 3 4 x 5 6 7 8] [1 3 5 7] [3 8]} | {[1 2 3 4 x 5 6 7 8] [2 4 6 8] [3 8]} |
| {[1 2 3 4 x 5 6 7 8] [1 3 5 7] [4 1]} | {[1 2 3 4 x 5 6 7 8] [2 4 6 8] [4 1]} |
| {[1 2 3 4 x 5 6 7 8] [1 3 5 7] [4 2]} | {[1 2 3 4 x 5 6 7 8] [2 4 6 8] [4 2]} |
| {[1 2 3 4 x 5 6 7 8] [1 3 5 7] [4 3]} | {[1 2 3 4 x 5 6 7 8] [2 4 6 8] [4 3]} |
| {[1 2 3 4 x 5 6 7 8] [1 3 5 7] [4 5]} | {[1 2 3 4 x 5 6 7 8] [2 4 6 8] [4 5]} |
| {[1 2 3 4 x 5 6 7 8] [1 3 5 7] [4 6]} | {[1 2 3 4 x 5 6 7 8] [2 4 6 8] [4 6]} |
| {[1 2 3 4 x 5 6 7 8] [1 3 5 7] [4 7]} | {[1 2 3 4 x 5 6 7 8] [2 4 6 8] [4 7]} |
| {[1 2 3 4 x 5 6 7 8] [1 3 5 7] [4 8]} | {[1 2 3 4 x 5 6 7 8] [2 4 6 8] [4 8]} |

"X" CAN BE ANY NUMBER OF 1 ~ 8

CSD STARTING INDEX FOR EIGHTEEN 26-TONE DRU (DRU26)     CSD STARTING INDEX FOR FOUR 106-TONE DRU (DRU106)
                                  CSD STARTING INDEX FOR EIGHT 52-TONE DRU (DRU52)     CSD STARTING INDEX FOR TWO 242-TONE DRU (DRU242)

Global CSD Start Index = {[1 2 3 4 1 5 6 7 8 1 2 3 4 3 5 6 7 8] [1 3 5 7 2 4 6 8] [1 5 2 6] [3 8]}

| |
|---|
| {[1 5 2 6 x 3 7 4 8 1 5 2 6 y 3 7 4 8] [1 2 3 4 5 6 7 8] [1 3 5 7] [1 2]} |
| {[1 5 2 6 x 3 7 4 8 1 5 2 6 y 3 7 4 8] [1 2 3 4 5 6 7 8] [1 3 5 7] [1 3]} |
| {[1 5 2 6 x 3 7 4 8 1 5 2 6 y 3 7 4 8] [1 2 3 4 5 6 7 8] [1 3 5 7] [1 4]} |
| {[1 5 2 6 x 3 7 4 8 1 5 2 6 y 3 7 4 8] [1 2 3 4 5 6 7 8] [1 3 5 7] [1 5]} |
| {[1 5 2 6 x 3 7 4 8 1 5 2 6 y 3 7 4 8] [1 2 3 4 5 6 7 8] [1 3 5 7] [1 6]} |
| {[1 5 2 6 x 3 7 4 8 1 5 2 6 y 3 7 4 8] [1 2 3 4 5 6 7 8] [1 3 5 7] [1 7]} |
| {[1 5 2 6 x 3 7 4 8 1 5 2 6 y 3 7 4 8] [1 2 3 4 5 6 7 8] [1 3 5 7] [1 8]} |
| {[1 5 2 6 x 3 7 4 8 1 5 2 6 y 3 7 4 8] [1 2 3 4 5 6 7 8] [1 3 5 7] [2 1]} |
| {[1 5 2 6 x 3 7 4 8 1 5 2 6 y 3 7 4 8] [1 2 3 4 5 6 7 8] [1 3 5 7] [2 3]} |
| {[1 5 2 6 x 3 7 4 8 1 5 2 6 y 3 7 4 8] [1 2 3 4 5 6 7 8] [1 3 5 7] [2 4]} |
| {[1 5 2 6 x 3 7 4 8 1 5 2 6 y 3 7 4 8] [1 2 3 4 5 6 7 8] [1 3 5 7] [2 5]} |
| {[1 5 2 6 x 3 7 4 8 1 5 2 6 y 3 7 4 8] [1 2 3 4 5 6 7 8] [1 3 5 7] [2 6]} |
| {[1 5 2 6 x 3 7 4 8 1 5 2 6 y 3 7 4 8] [1 2 3 4 5 6 7 8] [1 3 5 7] [2 7]} |
| {[1 5 2 6 x 3 7 4 8 1 5 2 6 y 3 7 4 8] [1 2 3 4 5 6 7 8] [1 3 5 7] [2 8]} |
| {[1 5 2 6 x 3 7 4 8 1 5 2 6 y 3 7 4 8] [1 2 3 4 5 6 7 8] [1 3 5 7] [3 1]} |
| {[1 5 2 6 x 3 7 4 8 1 5 2 6 y 3 7 4 8] [1 2 3 4 5 6 7 8] [1 3 5 7] [3 2]} |
| {[1 5 2 6 x 3 7 4 8 1 5 2 6 y 3 7 4 8] [1 2 3 4 5 6 7 8] [1 3 5 7] [3 4]} |
| {[1 5 2 6 x 3 7 4 8 1 5 2 6 y 3 7 4 8] [1 2 3 4 5 6 7 8] [1 3 5 7] [3 5]} |
| {[1 5 2 6 x 3 7 4 8 1 5 2 6 y 3 7 4 8] [1 2 3 4 5 6 7 8] [1 3 5 7] [3 6]} |
| {[1 5 2 6 x 3 7 4 8 1 5 2 6 y 3 7 4 8] [1 2 3 4 5 6 7 8] [1 3 5 7] [3 7]} |
| {[1 5 2 6 x 3 7 4 8 1 5 2 6 y 3 7 4 8] [1 2 3 4 5 6 7 8] [1 3 5 7] [3 8]} |
| {[1 5 2 6 x 3 7 4 8 1 5 2 6 y 3 7 4 8] [1 2 3 4 5 6 7 8] [1 3 5 7] [4 1]} |
| {[1 5 2 6 x 3 7 4 8 1 5 2 6 y 3 7 4 8] [1 2 3 4 5 6 7 8] [1 3 5 7] [4 2]} |
| {[1 5 2 6 x 3 7 4 8 1 5 2 6 y 3 7 4 8] [1 2 3 4 5 6 7 8] [1 3 5 7] [4 3]} |
| {[1 5 2 6 x 3 7 4 8 1 5 2 6 y 3 7 4 8] [1 2 3 4 5 6 7 8] [1 3 5 7] [4 5]} |
| {[1 5 2 6 x 3 7 4 8 1 5 2 6 y 3 7 4 8] [1 2 3 4 5 6 7 8] [1 3 5 7] [4 6]} |
| {[1 5 2 6 x 3 7 4 8 1 5 2 6 y 3 7 4 8] [1 2 3 4 5 6 7 8] [1 3 5 7] [4 7]} |
| {[1 5 2 6 x 3 7 4 8 1 5 2 6 y 3 7 4 8] [1 2 3 4 5 6 7 8] [1 3 5 7] [4 8]} |

"X" AND "Y" CAN BE ANY NUMBER OF 1 ~ 8

| |
|---|
| {[1 5 2 6 x 3 7 4 8 1 5 2 6 y 3 7 4 8] [1 2 3 4 5 6 7 8] [2 4 6 8] [1 2]} |
| {[1 5 2 6 x 3 7 4 8 1 5 2 6 y 3 7 4 8] [1 2 3 4 5 6 7 8] [2 4 6 8] [1 3]} |
| {[1 5 2 6 x 3 7 4 8 1 5 2 6 y 3 7 4 8] [1 2 3 4 5 6 7 8] [2 4 6 8] [1 4]} |
| {[1 5 2 6 x 3 7 4 8 1 5 2 6 y 3 7 4 8] [1 2 3 4 5 6 7 8] [2 4 6 8] [1 5]} |
| {[1 5 2 6 x 3 7 4 8 1 5 2 6 y 3 7 4 8] [1 2 3 4 5 6 7 8] [2 4 6 8] [1 6]} |
| {[1 5 2 6 x 3 7 4 8 1 5 2 6 y 3 7 4 8] [1 2 3 4 5 6 7 8] [2 4 6 8] [1 7]} |
| {[1 5 2 6 x 3 7 4 8 1 5 2 6 y 3 7 4 8] [1 2 3 4 5 6 7 8] [2 4 6 8] [1 8]} |
| {[1 5 2 6 x 3 7 4 8 1 5 2 6 y 3 7 4 8] [1 2 3 4 5 6 7 8] [2 4 6 8] [2 1]} |
| {[1 5 2 6 x 3 7 4 8 1 5 2 6 y 3 7 4 8] [1 2 3 4 5 6 7 8] [2 4 6 8] [2 3]} |
| {[1 5 2 6 x 3 7 4 8 1 5 2 6 y 3 7 4 8] [1 2 3 4 5 6 7 8] [2 4 6 8] [2 4]} |
| {[1 5 2 6 x 3 7 4 8 1 5 2 6 y 3 7 4 8] [1 2 3 4 5 6 7 8] [2 4 6 8] [2 5]} |
| {[1 5 2 6 x 3 7 4 8 1 5 2 6 y 3 7 4 8] [1 2 3 4 5 6 7 8] [2 4 6 8] [2 6]} |
| {[1 5 2 6 x 3 7 4 8 1 5 2 6 y 3 7 4 8] [1 2 3 4 5 6 7 8] [2 4 6 8] [2 7]} |
| {[1 5 2 6 x 3 7 4 8 1 5 2 6 y 3 7 4 8] [1 2 3 4 5 6 7 8] [2 4 6 8] [2 8]} |
| {[1 5 2 6 x 3 7 4 8 1 5 2 6 y 3 7 4 8] [1 2 3 4 5 6 7 8] [2 4 6 8] [3 1]} |
| {[1 5 2 6 x 3 7 4 8 1 5 2 6 y 3 7 4 8] [1 2 3 4 5 6 7 8] [2 4 6 8] [3 2]} |
| {[1 5 2 6 x 3 7 4 8 1 5 2 6 y 3 7 4 8] [1 2 3 4 5 6 7 8] [2 4 6 8] [3 4]} |
| {[1 5 2 6 x 3 7 4 8 1 5 2 6 y 3 7 4 8] [1 2 3 4 5 6 7 8] [2 4 6 8] [3 5]} |
| {[1 5 2 6 x 3 7 4 8 1 5 2 6 y 3 7 4 8] [1 2 3 4 5 6 7 8] [2 4 6 8] [3 6]} |
| {[1 5 2 6 x 3 7 4 8 1 5 2 6 y 3 7 4 8] [1 2 3 4 5 6 7 8] [2 4 6 8] [3 7]} |
| {[1 5 2 6 x 3 7 4 8 1 5 2 6 y 3 7 4 8] [1 2 3 4 5 6 7 8] [2 4 6 8] [3 8]} |
| {[1 5 2 6 x 3 7 4 8 1 5 2 6 y 3 7 4 8] [1 2 3 4 5 6 7 8] [2 4 6 8] [4 1]} |
| {[1 5 2 6 x 3 7 4 8 1 5 2 6 y 3 7 4 8] [1 2 3 4 5 6 7 8] [2 4 6 8] [4 2]} |
| {[1 5 2 6 x 3 7 4 8 1 5 2 6 y 3 7 4 8] [1 2 3 4 5 6 7 8] [2 4 6 8] [4 3]} |
| {[1 5 2 6 x 3 7 4 8 1 5 2 6 y 3 7 4 8] [1 2 3 4 5 6 7 8] [2 4 6 8] [4 5]} |
| {[1 5 2 6 x 3 7 4 8 1 5 2 6 y 3 7 4 8] [1 2 3 4 5 6 7 8] [2 4 6 8] [4 6]} |
| {[1 5 2 6 x 3 7 4 8 1 5 2 6 y 3 7 4 8] [1 2 3 4 5 6 7 8] [2 4 6 8] [4 7]} |
| {[1 5 2 6 x 3 7 4 8 1 5 2 6 y 3 7 4 8] [1 2 3 4 5 6 7 8] [2 4 6 8] [4 8]} |

"X" AND "Y" CAN BE ANY NUMBER OF 1 ~ 8

| |
|---|
| {[1 5 2 6 3 7 4 8 1 5 2 6 3 7 4 8] [1 2 3 4 5 6 7 8] [1 3 5 7] [1 2]} |
| {[1 5 2 6 3 7 4 8 1 5 2 6 3 7 4 8] [1 2 3 4 5 6 7 8] [1 3 5 7] [1 3]} |
| {[1 5 2 6 3 7 4 8 1 5 2 6 3 7 4 8] [1 2 3 4 5 6 7 8] [1 3 5 7] [1 4]} |
| {[1 5 2 6 3 7 4 8 1 5 2 6 3 7 4 8] [1 2 3 4 5 6 7 8] [1 3 5 7] [1 5]} |
| {[1 5 2 6 3 7 4 8 1 5 2 6 3 7 4 8] [1 2 3 4 5 6 7 8] [1 3 5 7] [1 6]} |
| {[1 5 2 6 3 7 4 8 1 5 2 6 3 7 4 8] [1 2 3 4 5 6 7 8] [1 3 5 7] [1 7]} |
| {[1 5 2 6 3 7 4 8 1 5 2 6 3 7 4 8] [1 2 3 4 5 6 7 8] [1 3 5 7] [1 8]} |
| {[1 5 2 6 3 7 4 8 1 5 2 6 3 7 4 8] [1 2 3 4 5 6 7 8] [1 3 5 7] [2 1]} |
| {[1 5 2 6 3 7 4 8 1 5 2 6 3 7 4 8] [1 2 3 4 5 6 7 8] [1 3 5 7] [2 3]} |
| {[1 5 2 6 3 7 4 8 1 5 2 6 3 7 4 8] [1 2 3 4 5 6 7 8] [1 3 5 7] [2 4]} |
| {[1 5 2 6 3 7 4 8 1 5 2 6 3 7 4 8] [1 2 3 4 5 6 7 8] [1 3 5 7] [2 5]} |
| {[1 5 2 6 3 7 4 8 1 5 2 6 3 7 4 8] [1 2 3 4 5 6 7 8] [1 3 5 7] [2 6]} |
| {[1 5 2 6 3 7 4 8 1 5 2 6 3 7 4 8] [1 2 3 4 5 6 7 8] [1 3 5 7] [2 7]} |
| {[1 5 2 6 3 7 4 8 1 5 2 6 3 7 4 8] [1 2 3 4 5 6 7 8] [1 3 5 7] [2 8]} |
| {[1 5 2 6 3 7 4 8 1 5 2 6 3 7 4 8] [1 2 3 4 5 6 7 8] [1 3 5 7] [3 1]} |
| {[1 5 2 6 3 7 4 8 1 5 2 6 3 7 4 8] [1 2 3 4 5 6 7 8] [1 3 5 7] [3 2]} |
| {[1 5 2 6 3 7 4 8 1 5 2 6 3 7 4 8] [1 2 3 4 5 6 7 8] [1 3 5 7] [3 4]} |
| {[1 5 2 6 3 7 4 8 1 5 2 6 3 7 4 8] [1 2 3 4 5 6 7 8] [1 3 5 7] [3 5]} |
| {[1 5 2 6 3 7 4 8 1 5 2 6 3 7 4 8] [1 2 3 4 5 6 7 8] [1 3 5 7] [3 6]} |
| {[1 5 2 6 3 7 4 8 1 5 2 6 3 7 4 8] [1 2 3 4 5 6 7 8] [1 3 5 7] [3 7]} |
| {[1 5 2 6 3 7 4 8 1 5 2 6 3 7 4 8] [1 2 3 4 5 6 7 8] [1 3 5 7] [3 8]} |
| {[1 5 2 6 3 7 4 8 1 5 2 6 3 7 4 8] [1 2 3 4 5 6 7 8] [1 3 5 7] [4 1]} |
| {[1 5 2 6 3 7 4 8 1 5 2 6 3 7 4 8] [1 2 3 4 5 6 7 8] [1 3 5 7] [4 2]} |
| {[1 5 2 6 3 7 4 8 1 5 2 6 3 7 4 8] [1 2 3 4 5 6 7 8] [1 3 5 7] [4 3]} |
| {[1 5 2 6 3 7 4 8 1 5 2 6 3 7 4 8] [1 2 3 4 5 6 7 8] [1 3 5 7] [4 5]} |
| {[1 5 2 6 3 7 4 8 1 5 2 6 3 7 4 8] [1 2 3 4 5 6 7 8] [1 3 5 7] [4 6]} |
| {[1 5 2 6 3 7 4 8 1 5 2 6 3 7 4 8] [1 2 3 4 5 6 7 8] [1 3 5 7] [4 7]} |
| {[1 5 2 6 3 7 4 8 1 5 2 6 3 7 4 8] [1 2 3 4 5 6 7 8] [1 3 5 7] [4 8]} |

| | | | |
|---|---|---|---|
| {[1 5 2 6 3 7 4 8 1 5 2 6 3 7 4 8] | [1 2 3 4 5 6 7 8] | [2 4 6 8] | [1 2]} |
| {[1 5 2 6 3 7 4 8 1 5 2 6 3 7 4 8] | [1 2 3 4 5 6 7 8] | [2 4 6 8] | [1 3]} |
| {[1 5 2 6 3 7 4 8 1 5 2 6 3 7 4 8] | [1 2 3 4 5 6 7 8] | [2 4 6 8] | [1 4]} |
| {[1 5 2 6 3 7 4 8 1 5 2 6 3 7 4 8] | [1 2 3 4 5 6 7 8] | [2 4 6 8] | [1 5]} |
| {[1 5 2 6 3 7 4 8 1 5 2 6 3 7 4 8] | [1 2 3 4 5 6 7 8] | [2 4 6 8] | [1 6]} |
| {[1 5 2 6 3 7 4 8 1 5 2 6 3 7 4 8] | [1 2 3 4 5 6 7 8] | [2 4 6 8] | [1 7]} |
| {[1 5 2 6 3 7 4 8 1 5 2 6 3 7 4 8] | [1 2 3 4 5 6 7 8] | [2 4 6 8] | [1 8]} |
| {[1 5 2 6 3 7 4 8 1 5 2 6 3 7 4 8] | [1 2 3 4 5 6 7 8] | [2 4 6 8] | [2 1]} |
| {[1 5 2 6 3 7 4 8 1 5 2 6 3 7 4 8] | [1 2 3 4 5 6 7 8] | [2 4 6 8] | [2 3]} |
| {[1 5 2 6 3 7 4 8 1 5 2 6 3 7 4 8] | [1 2 3 4 5 6 7 8] | [2 4 6 8] | [2 4]} |
| {[1 5 2 6 3 7 4 8 1 5 2 6 3 7 4 8] | [1 2 3 4 5 6 7 8] | [2 4 6 8] | [2 5]} |
| {[1 5 2 6 3 7 4 8 1 5 2 6 3 7 4 8] | [1 2 3 4 5 6 7 8] | [2 4 6 8] | [2 6]} |
| {[1 5 2 6 3 7 4 8 1 5 2 6 3 7 4 8] | [1 2 3 4 5 6 7 8] | [2 4 6 8] | [2 7]} |
| {[1 5 2 6 3 7 4 8 1 5 2 6 3 7 4 8] | [1 2 3 4 5 6 7 8] | [2 4 6 8] | [2 8]} |
| {[1 5 2 6 3 7 4 8 1 5 2 6 3 7 4 8] | [1 2 3 4 5 6 7 8] | [2 4 6 8] | [3 1]} |
| {[1 5 2 6 3 7 4 8 1 5 2 6 3 7 4 8] | [1 2 3 4 5 6 7 8] | [2 4 6 8] | [3 2]} |
| {[1 5 2 6 3 7 4 8 1 5 2 6 3 7 4 8] | [1 2 3 4 5 6 7 8] | [2 4 6 8] | [3 4]} |
| {[1 5 2 6 3 7 4 8 1 5 2 6 3 7 4 8] | [1 2 3 4 5 6 7 8] | [2 4 6 8] | [3 5]} |
| {[1 5 2 6 3 7 4 8 1 5 2 6 3 7 4 8] | [1 2 3 4 5 6 7 8] | [2 4 6 8] | [3 6]} |
| {[1 5 2 6 3 7 4 8 1 5 2 6 3 7 4 8] | [1 2 3 4 5 6 7 8] | [2 4 6 8] | [3 7]} |
| {[1 5 2 6 3 7 4 8 1 5 2 6 3 7 4 8] | [1 2 3 4 5 6 7 8] | [2 4 6 8] | [3 8]} |
| {[1 5 2 6 3 7 4 8 1 5 2 6 3 7 4 8] | [1 2 3 4 5 6 7 8] | [2 4 6 8] | [4 1]} |
| {[1 5 2 6 3 7 4 8 1 5 2 6 3 7 4 8] | [1 2 3 4 5 6 7 8] | [2 4 6 8] | [4 2]} |
| {[1 5 2 6 3 7 4 8 1 5 2 6 3 7 4 8] | [1 2 3 4 5 6 7 8] | [2 4 6 8] | [4 3]} |
| {[1 5 2 6 3 7 4 8 1 5 2 6 3 7 4 8] | [1 2 3 4 5 6 7 8] | [2 4 6 8] | [4 5]} |
| {[1 5 2 6 3 7 4 8 1 5 2 6 3 7 4 8] | [1 2 3 4 5 6 7 8] | [2 4 6 8] | [4 6]} |
| {[1 5 2 6 3 7 4 8 1 5 2 6 3 7 4 8] | [1 2 3 4 5 6 7 8] | [2 4 6 8] | [4 7]} |
| {[1 5 2 6 3 7 4 8 1 5 2 6 3 7 4 8] | [1 2 3 4 5 6 7 8] | [2 4 6 8] | [4 8]} |

FIG. 39

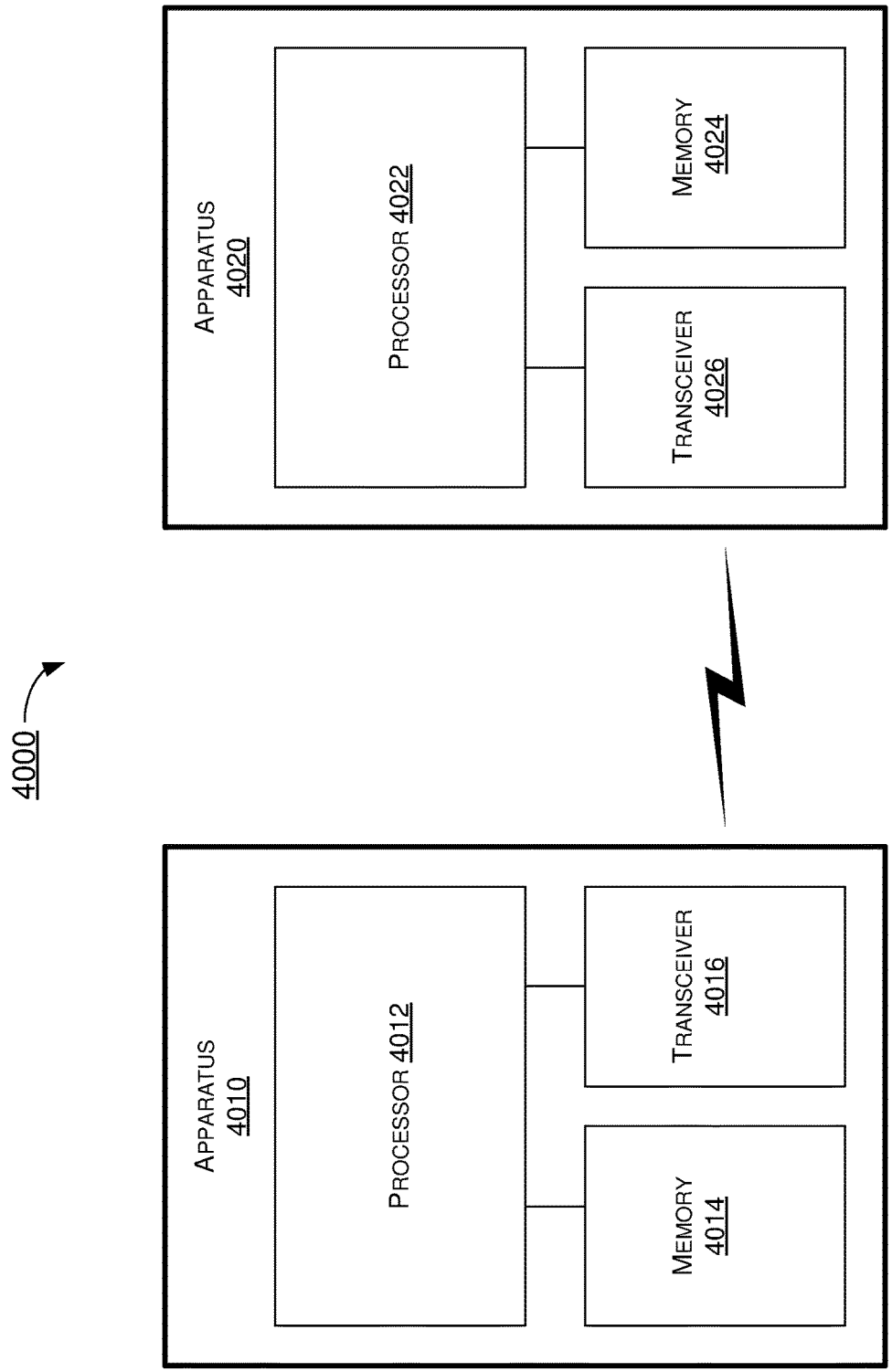

4100

APPLY, BY A PROCESSOR OF AN APPARATUS, A CYCLIC SHIFT DELAY (CSD) INDEX ASSIGNMENT IN DISTRIBUTING A PLURALITY OF SUBCARRIERS OF A RESOURCE UNIT (RU) OVER A BANDWIDTH TO GENERATE AN EXTREMELY-HIGH-THROUGHPUT SHORT TRAINING FIELD (EHT-STF) OF A DISTRIBUTED-TONE RU (dRU), WITH THE CSD INDEX ASSIGNMENT BEING BASED ON A dRU HIERARCHICAL STRUCTURE WITH ONE OR MORE CSD INDEXES SHARED AMONG MULTIPLE dRUs OF DIFFERENT SIZES BUT NOT AMONG MULTIPLE dRUs OF A SAME SIZE

4110

TRANSMIT, BY THE PROCESSOR, SYMBOLS OF THE EHT-STF OF THE dRU

GLOBAL CSD INDEX ASSIGNMENT FOR DISTRIBUTED-TONE RESOURCE UNIT TRANSMISSIONS

CROSS REFERENCE TO RELATED PATENT APPLICATION

The present disclosure is part of a non-provisional patent application claiming the priority benefit of U.S. Provisional Patent Application Nos. 63/246,830, 63/272,347, 63/274,568, 63/275,975, 63/276,811 and 63/281,756, filed 22 Sep. 2021, 27 Oct. 2021, 2 Nov. 2021, 5 Nov. 2021, 8 Nov. 2021 and 22 Nov. 2021, respectively, the contents of which being incorporated by reference in their entirety.

TECHNICAL FIELD

The present disclosure is generally related to wireless communications and, more particularly, to global cyclic shift delay (CSD) assignment for distributed-tone resource unit (dRU) transmissions in wireless communications.

BACKGROUND

Unless otherwise indicated herein, approaches described in this section are not prior art to the claims listed below and are not admitted as prior art by inclusion in this section.

There are strict power spectral density (PSD) requirements for low-power indoor (LPI) applications in 6 GHz which tend to result in lower power in transmission and short coverage range. One approach to improving coverage range is to distribute tones of a regular resource unit (RU) (herein interchangeably referred to as "rRU", "regular RU" and "logical RU") over a wider bandwidth or a large frequency subblock, thereby resulting in interleaved, interlaced or otherwise dRUs and distributed-tone multi-resource units (dMRUs) to boost transmission power and achieve better coverage range for 6 GHz low-power indoor (LPI) systems. Unlike rRUs in which subcarriers are basically continuous or adjacent to one another, the subcarriers in dRUs and dMRUs are spread over a wider bandwidth and hence the tones are separated apart with different distances therebetween.

It has been proposed that extremely-high-throughput short training field (EHT-STF) transmissions of dRUs are to use an EHT-STF sequence defined for the distribution bandwidth as follows: subcarrier range (Kr)=242-tone rRU (or rRU242) for all dRUs on a 20 MHz bandwidth (or BW20), Kr=484-tone rRU (or rRU484) for all dRUs on a 40 MHz bandwidth (or BW40), and Kr=996-tone rRU (or rRU996) for all dRUs on an 80 MHz bandwidth (or BW80). However, the EHT-STF symbols using the same EHT-STF sequence are added together from multiple dRU stations (STAs) and, thus, may cause unintentional beamforming issue(s), thereby resulting in inaccuracy in power measurement and automatic gain control (AGC) adjustment. Applying CSD on transmission signals can be used to mitigate the unintentional beamforming issue(s). However, how global CSD indexes are to be assigned (so as to avoid the possibility of the same CSD index(es) being re-used or overlapped to improve accuracy in power measurement) remains to be defined. Therefore, there is a need for a solution for global CSD assignment for dRU transmissions in wireless communications.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to provide schemes, concepts, designs, techniques, methods and apparatuses pertaining to global CSD assignment for dRU transmissions in wireless communications.

In one aspect, a method may involve a processor of an apparatus applying a CSD index assignment in distributing a plurality of subcarriers of a RU)over a bandwidth to generate an EHT-STF of a dRU. The method may also involve the processor transmitting symbols of the EHT-STF of the dRU. The CSD index assignment may be based on a dRU hierarchical structure with one or more CSD indexes shared among multiple dRUs of different sizes but not among multiple dRUs of a same size.

In another aspect, an apparatus may include a transceiver and a processor coupled to the transceiver. The transceiver may be configured to transmit and receive wirelessly. The processor may be configured to apply a CSD index assignment in distributing a plurality of subcarriers of a RU)over a bandwidth to generate an EHT-STF of a dRU. The processor may also transmit, via the transceiver, symbols of the EHT-STF of the dRU. The CSD index assignment may be based on a dRU hierarchical structure with one or more CSD indexes shared among multiple dRUs of different sizes but not among multiple dRUs of a same size.

It is noteworthy that, although description provided herein may be in the context of certain radio access technologies, networks and network topologies such as, Wi-Fi, the proposed concepts, schemes and any variation(s)/derivative(s) thereof may be implemented in, for and by other types of radio access technologies, networks and network topologies such as, for example and without limitation, Bluetooth, ZigBee, $5^{th}$ Generation (5G)/New Radio (NR), Long-Term Evolution (LTE), LTE-Advanced, LTE-Advanced Pro, Internet-of-Things (IoT), Industrial IoT (IIoT) and narrowband IoT (NB-IoT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation to clearly illustrate the concept of the present disclosure.

FIG. 3 is a diagram of an example design under a proposed scheme in accordance with the present disclosure.

FIG. 4 is a diagram of an example design under a proposed scheme in accordance with the present disclosure.

FIG. 7 is a diagram of an example design under a proposed scheme in accordance with the present disclosure.

FIG. 8 is a diagram of an example design under a proposed scheme in accordance with the present disclosure.

FIG. 9 is a diagram of an example design under a proposed scheme in accordance with the present disclosure.

FIG. 11 is a diagram of an example design under a proposed scheme in accordance with the present disclosure.

FIG. 12 is a diagram of an example design under a proposed scheme in accordance with the present disclosure.

FIG. 13 is a diagram of an example design under a proposed scheme in accordance with the present disclosure.

FIG. 14 is a diagram of an example design under a proposed scheme in accordance with the present disclosure.

FIG. 15 is a diagram of an example design under a proposed scheme in accordance with the present disclosure.

FIG. 16 is a diagram of an example design under a proposed scheme in accordance with the present disclosure.

FIG. 17 is a diagram of an example scenario under a proposed scheme in accordance with the present disclosure.

FIG. 18 is a diagram of an example design under a proposed scheme in accordance with the present disclosure.

FIG. 20 is a diagram of an example design under a proposed scheme in accordance with the present disclosure.

FIG. 22 is a diagram of an example design under a proposed scheme in accordance with the present disclosure.

FIG. 26 is a diagram of an example design under a proposed scheme in accordance with the present disclosure.

FIG. 27 is a diagram of an example design under a proposed scheme in accordance with the present disclosure.

FIG. 28 is a diagram of an example design under a proposed scheme in accordance with the present disclosure.

FIG. 29 is a diagram of an example design under a proposed scheme in accordance with the present disclosure.

FIG. 31 is a diagram of an example design under a proposed scheme in accordance with the present disclosure.

FIG. 33 is a diagram of an example design under a proposed scheme in accordance with the present disclosure.

FIG. 34 is a diagram of an example design under a proposed scheme in accordance with the present disclosure.

FIG. 35 is a diagram of an example design under a proposed scheme in accordance with the present disclosure.

FIG. 36 is a diagram of an example design under a proposed scheme in accordance with the present disclosure.

FIG. 38 is a diagram of an example design under a proposed scheme in accordance with the present disclosure.

FIG. 39 is a diagram of an example design under a proposed scheme in accordance with the present disclosure.

FIG. 40 is a block diagram of an example communication system in accordance with an implementation of the present disclosure.

FIG. 41 is a flowchart of an example process in accordance with an implementation of the present disclosure.

DETAILED DESCRIPTION OF PREFERRED EMBODIMENTS

Figure 1:
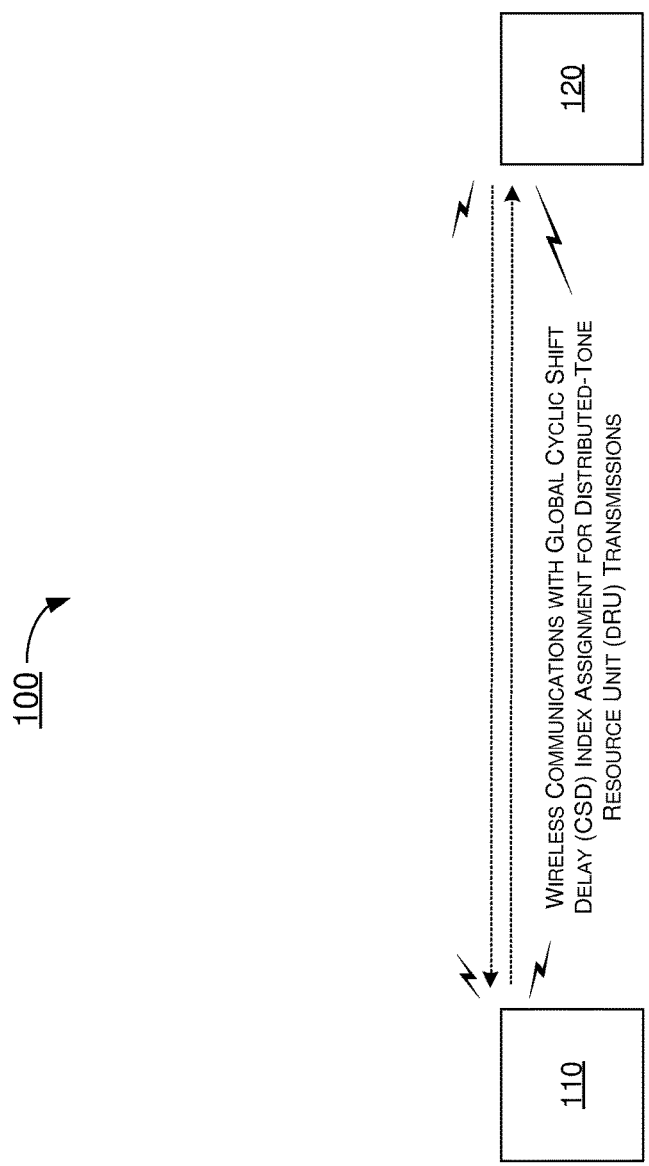
FIG. 1 is a diagram of an example network environment in which various solutions and schemes in accordance with the present disclosure may be implemented.

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to global CSD assignment for dRU transmissions in wireless communications. According to the present disclosure, a number of possible solutions may be implemented separately or jointly. That is, although these possible solutions may be described below separately, two or more of these possible solutions may be implemented in one combination or another.

It is noteworthy that, in the present disclosure, a regular RU (rRU) refers to a RU with tones that are continuous (e.g., adjacent to one another) and not interleaved, interlaced or otherwise distributed. Moreover, a 26-tone regular RU may be interchangeably denoted as RU26 (or rRU26), a 52-tone regular RU may be interchangeably denoted as RU52 (or rRU52), a 106-tone regular RU may be interchangeably denoted as RU106 (or rRU106), a 242-tone regular RU may be interchangeably denoted as RU242 (or rRU242), and so on. Moreover, an aggregate (26+52)-tone regular multi-RU (MRU) may be interchangeably denoted as MRU78 (or rMRU78), an aggregate (26+106)-tone regular MRU may be interchangeably denoted as MRU132 (or rMRU132), and so on. Furthermore, in the present disclosure, a 26-tone distributed-tone RU may be interchangeably denoted as dRU26, a 52-tone distributed-tone RU may be interchangeably denoted as dRU52, a 106-tone distributed-tone RU may be interchangeably denoted as dRU106, a 242-tone distributed-tone RU may be interchangeably denoted as dRU242, and so on. Additionally, an aggregate (26+52)-tone distributed-tone MRU may be interchangeably denoted as dMRU78, an aggregate (26+106)-tone distributed-tone MRU may be interchangeably denoted as dMRU132, and so on.

Since the above examples are merely illustrative examples and not an exhaustive listing of all possibilities, the same applies to regular RUs, distributed-tone RUs, MRUs, and distributed-tone MRUs of different sizes (or different number of tones). It is also noteworthy that, in the present disclosure, a bandwidth of 20 MHz may be interchangeably denoted as BW20, a bandwidth of 40 MHz may be interchangeably denoted as BW40, a bandwidth of 80 MHz may be interchangeably denoted as BW80, a bandwidth of 160 MHz may be interchangeably denoted as BW160, a bandwidth of 240 MHz may be interchangeably denoted as BW240, and a bandwidth of 320 MHz may be interchangeably denoted as BW320. It is further noteworthy that, in the present disclosure, a 26-tone interleaved-tone (or interlaced-tone) RU may be interchangeably denoted as iRU26 as well as dRU26 (26-tone distributed-tone RU), a 52-tone interleaved-tone (or interlaced-tone) RU may be interchangeably denoted as iRU52 as well as dRU52 (52-tone distributed-tone RU), a 106-tone interleaved-tone (or interlaced-tone) RU may be interchangeably denoted as iRU106 as well as dRU106 (106-tone distributed-tone RU), a 242-tone interleaved-tone (or interlaced-tone) RU may be interchangeably denoted as iRU242 as well as dRU242 (242-tone distributed-tone RU), and a 484-tone interleaved-tone (or interlaced-tone) RU may be interchangeably denoted as iRU484 as well as dRU484 (484-tone distributed-tone RU).

FIG. 1 illustrates an example network environment 100 in which various solutions and schemes in accordance with the present disclosure may be implemented. FIG. 2~FIG. 41 illustrate examples of implementation of various proposed schemes in network environment 100 in accordance with the present disclosure. The following description of various proposed schemes is provided with reference to FIG. 1~FIG. 41.

Referring to FIG. 1, network environment 100 may involve a communication entity 110 and a communication entity 120 communicating wirelessly (e.g., in a WLAN in accordance with one or more Institute of Electrical and Electronics Engineers (IEEE) 802.11 standards). For instance, communication entity 110 may be a first STA and communication entity 120 may be a second STA, with each of the first STA and second STA functioning as either an access point (AP) STA or a non-AP STA. Under various proposed schemes in accordance with the present disclosure, communication entity 110 and communication entity 120 may be configured to communicate wirelessly with global CSD assignment for dRU transmissions in wireless communications, as described herein.

With respect to consideration of global CSD index assignment, one approach for global CSD start index assignment may be based on each STA's identification (ID), or association ID (AID)12 in the User Info field, and each STA's CSD start index may be calculated using a modulo operation as follows: CSD start index=mod(AID12, maxNss), where maxNss denotes the maximum number of spatial streams, with maxNss=8 or 16. Another approach for global CSD start index assignment may be based on random generation at each STA. However, aforementioned two approaches tend to have the common problem of CSD index overlap in that one CSD index may be re-used or shared by multiple STAs.

Figure 2:
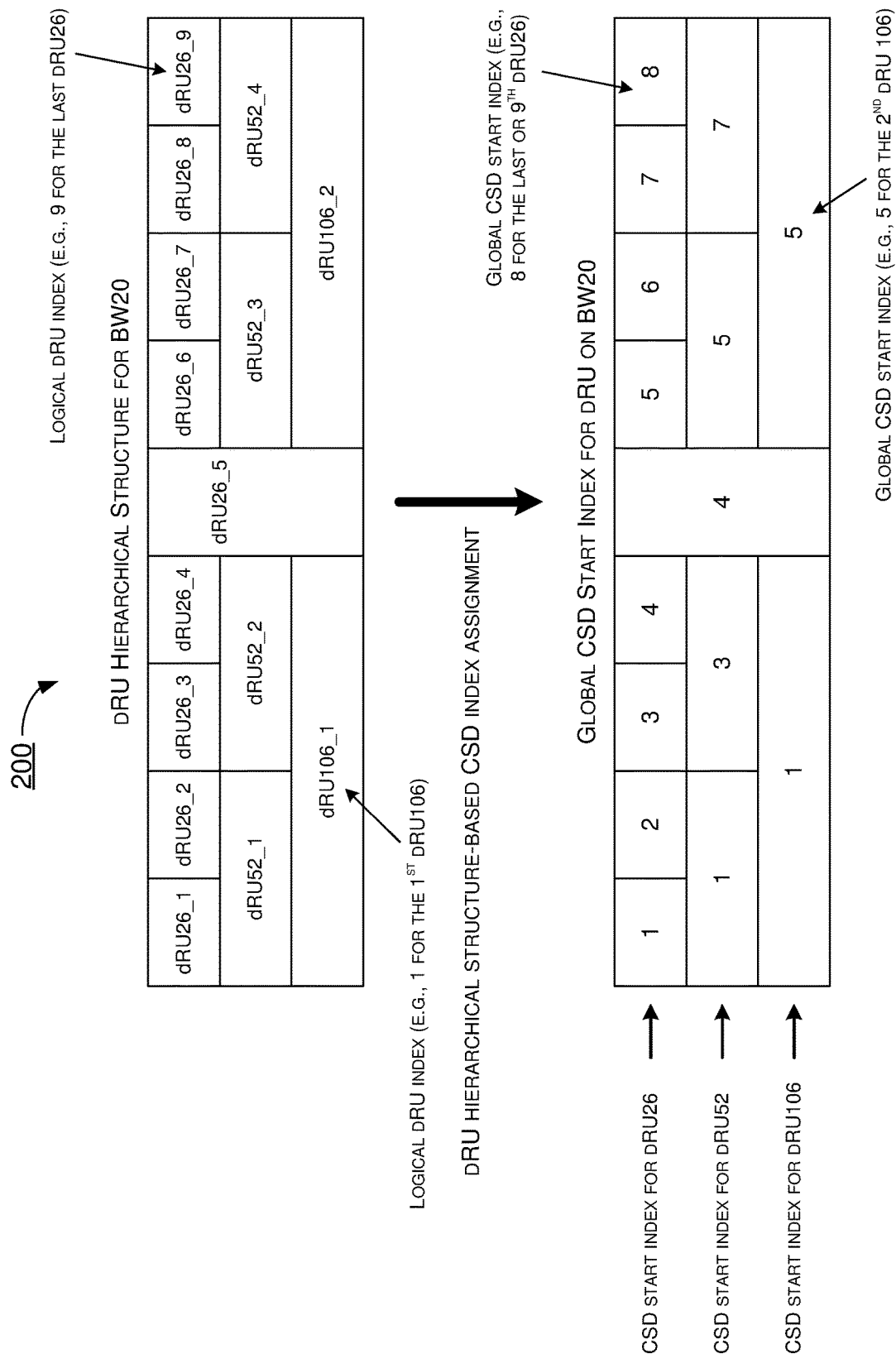
FIG. 2 is a diagram of an example design under a proposed scheme in accordance with the present disclosure.

Under a proposed scheme in accordance with the present disclosure, to avoid or otherwise reduce the CSD index overlap issue, global CSD start index assignment may be based on a dRU hierarchical structure. Similar to a rRU, a dRU may also preserve the hierarchical structure. For example, dRU52_1 is composed of dRU26_1 and dRU26_2, and dRU106_1 is composed of dRU52_1 and dRU52_2, and so on. When an AP performs dRU assignments, the AP may follow the dRU hierarchical structure to avoid dRU tone overlap. FIG. 2 illustrates an example design 200 under the proposed scheme. Referring to design 200, a dRU hierarchical structure for BW20 is shown in the upper portion of FIG. 2 and a correspondingly global CSD start index assignment for dRUs on BW20 is shown in the lower portion of FIG. 2. Accordingly, when dRU52_1 is assigned to one user, dRU26_1 and dRU26_2 would not be scheduled to any STA. Thus, the same CSD index may be assigned to dRU26_1 and dRU52_1 without encountering the CSD index overlap issue. Moreover, using the same dRU hierarchical structure, a given CSD index may be shared among dRUs of different sizes but not shared among dRUs of the same size. With the limited number of available CSD values (e.g., up to 8 for maxNss=8 and up to 16 for maxNss=16), sharing of CSD index among dRUs of different sizes while restricting sharing among dRUs of the same size may enhance efficiency in utilizing the limited CSD values, thereby reducing the probability of CSD index overlap.

Under a proposed scheme in accordance with the present disclosure, for a dRU scheduled with a number of spatial stream (Nss)>1, the range of CSD index for the dRU may be expressed as follows:

$$\text{mod}([\text{CSD start index:CSD start index}+N_{ss}-1]-1, \text{maxNss})+1$$

For example, with maxNss=8, CSD start index=7 and Nss=4, the CSD index range may be mod([7:7+4−1]−1, 8)+1=[7 8 1 2] with the assumption that the first CSD index is "1". In case that the first CSD index is "0", then the CSD index range for the dRU may be expressed as follows:

$$\text{mod}([\text{CSD start index:CSD start index}+N_{ss}-1], \text{maxNss})$$

FIG. 3 illustrates an example design 300 under the proposed scheme. Specifically, design 300 pertains to CSD index assignment for maxNss=8. It is noteworthy that, in design 300 for BW20, it is assumed that the first starting index is from "1", although the starting index may also be from "0" (in which case the index in each table shown in FIG. 3 may simply be subtracted by 1). It is also noteworthy that the CSD index assignment may be further optimized for BW40 and BW80.

FIG. 4 illustrates an example design 400 under the proposed scheme. Specifically, design 400 pertains to CSD index assignment for maxNss=16. It is noteworthy that, in design 400 for BW20, it is assumed that the first starting index is from "1", although the starting index may also be from "0" (in which case the index in each table shown in FIG. 4 may simply be subtracted by 1). It is also noteworthy that the CSD index assignment may be further optimized for BW40 and BW80.

Figure 5:
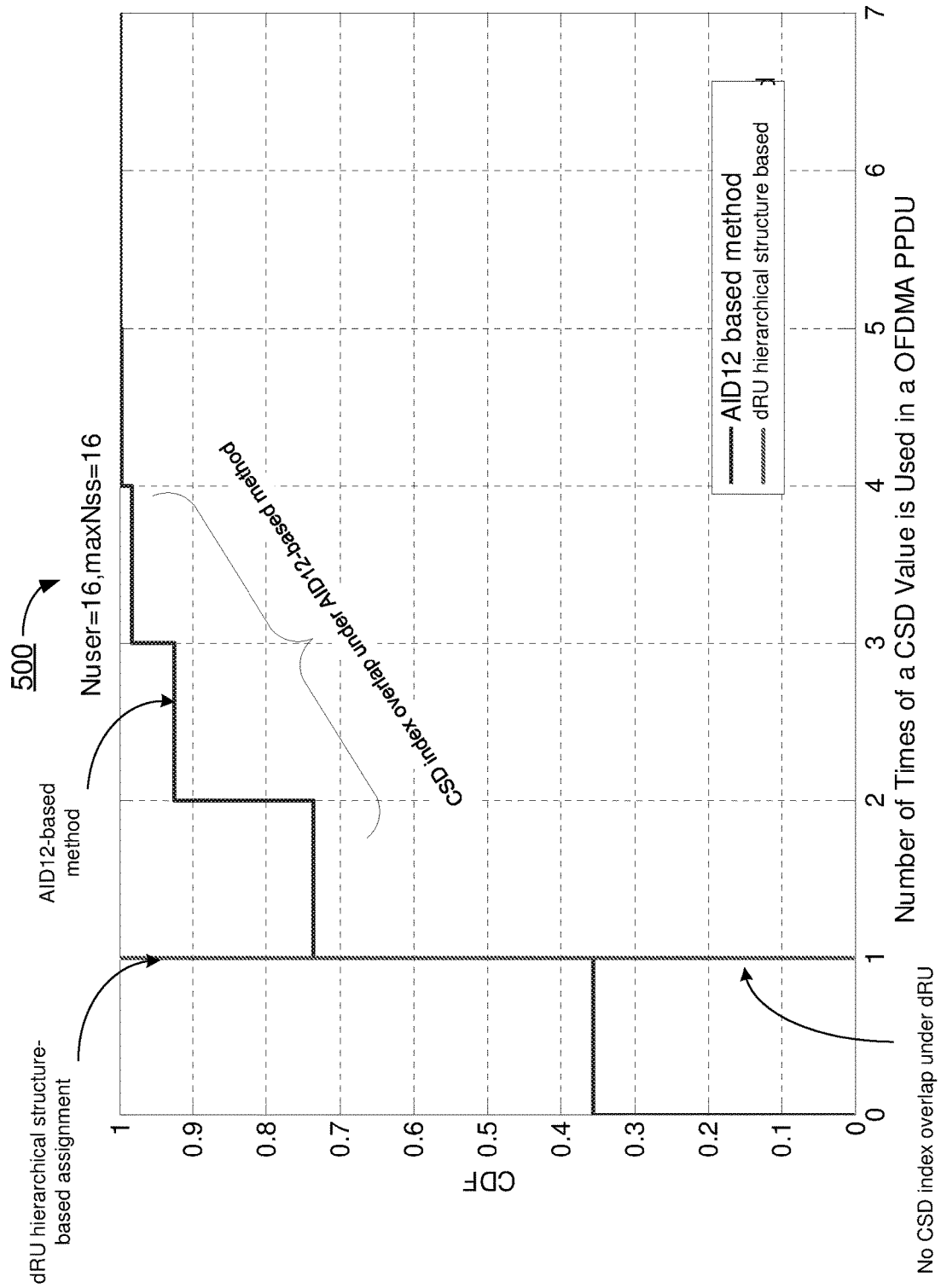
FIG. 5 is a diagram of an example scenario under a proposed scheme in accordance with the present disclosure.
Figure 6:
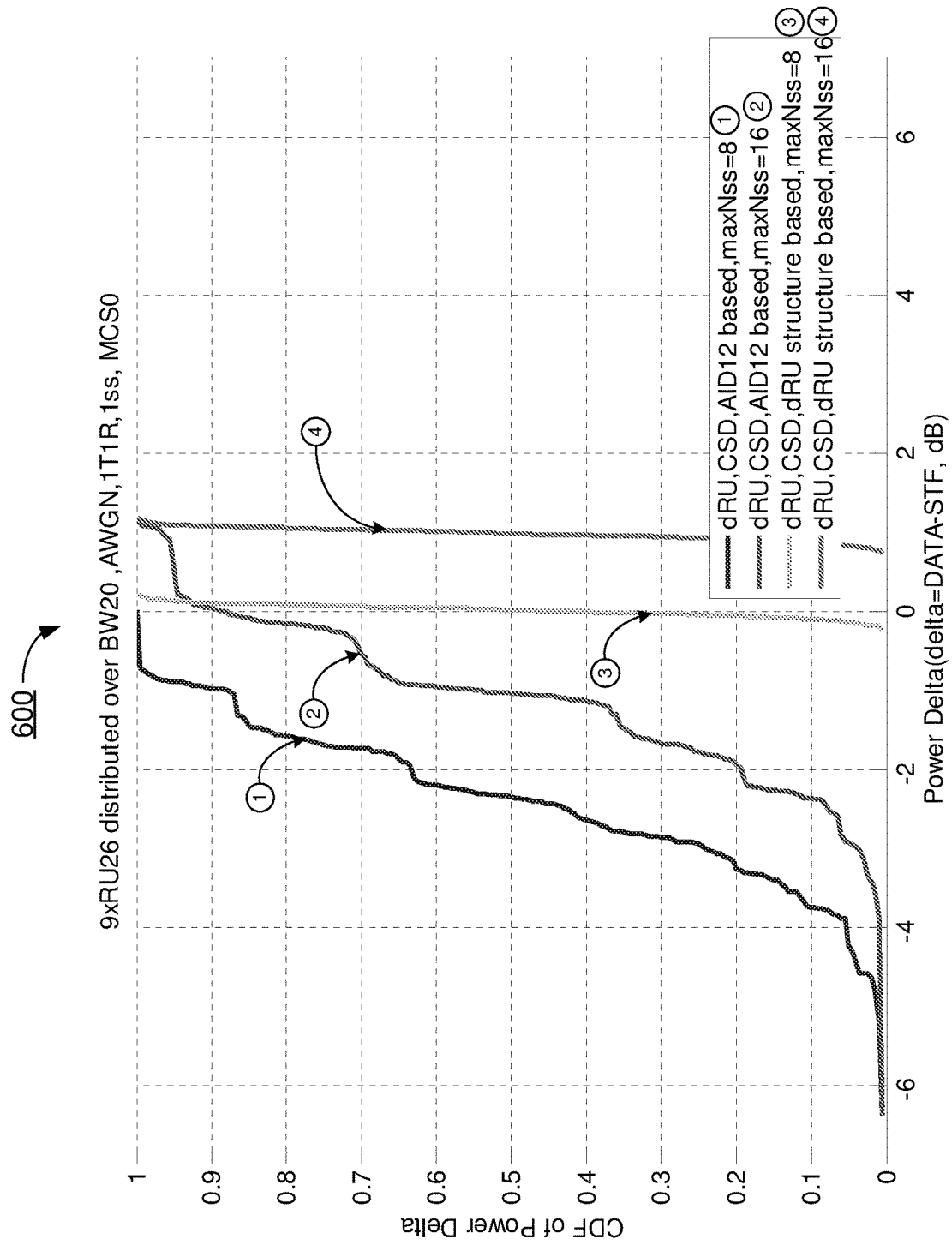
FIG. 6 is a diagram of an example scenario under a proposed scheme in accordance with the present disclosure.

FIG. 5 illustrates an example scenario 500 under the proposed scheme. Specifically, scenario 500 is an example scenario in which the dRU hierarchical structure-based CSD index assignment greatly reduces CSD index overlap. FIG. 6 illustrates an example scenario 600 under the proposed scheme. Specifically, scenario 600 is an example scenario in which the accuracy in EHT-STF power measurement is greatly improved by applying global CSD with the dRU hierarchical structure-based CSD index assignment under the proposed scheme. It is noteworthy that the simulation the produced the graph shown in FIG. 6 was performed with the assumption of ideal synchronizations on each STA (e.g., no timing error or frequency error). It is also noteworthy that the accuracy in power measurement is calculated by a different (or power delta) between EHT-STF symbols and data symbols.

Considering multiple-input-multiple-output (MIMO) transmissions on dRU (e.g., the number of spatial streams Nss=2), described below are some proposed schemes that aim to further optimize above-described proposed schemes regarding dRU index-based global CSD index assignment to reduce the possibility of collision of CSD usages, thereby reducing or otherwise avoiding the same CSD index(es) or value(s) being shared by multiple STAs. Furthermore, under some of the proposed schemes, a circular shift version of the global CSD index assignment may be utilized when global CSD is also applied on entire EHT-modulated fields (e.g., EHT-STF, EHT long training field (EHT-LTF), and EHT data (EHT-DATA) fields).

Figure 7:
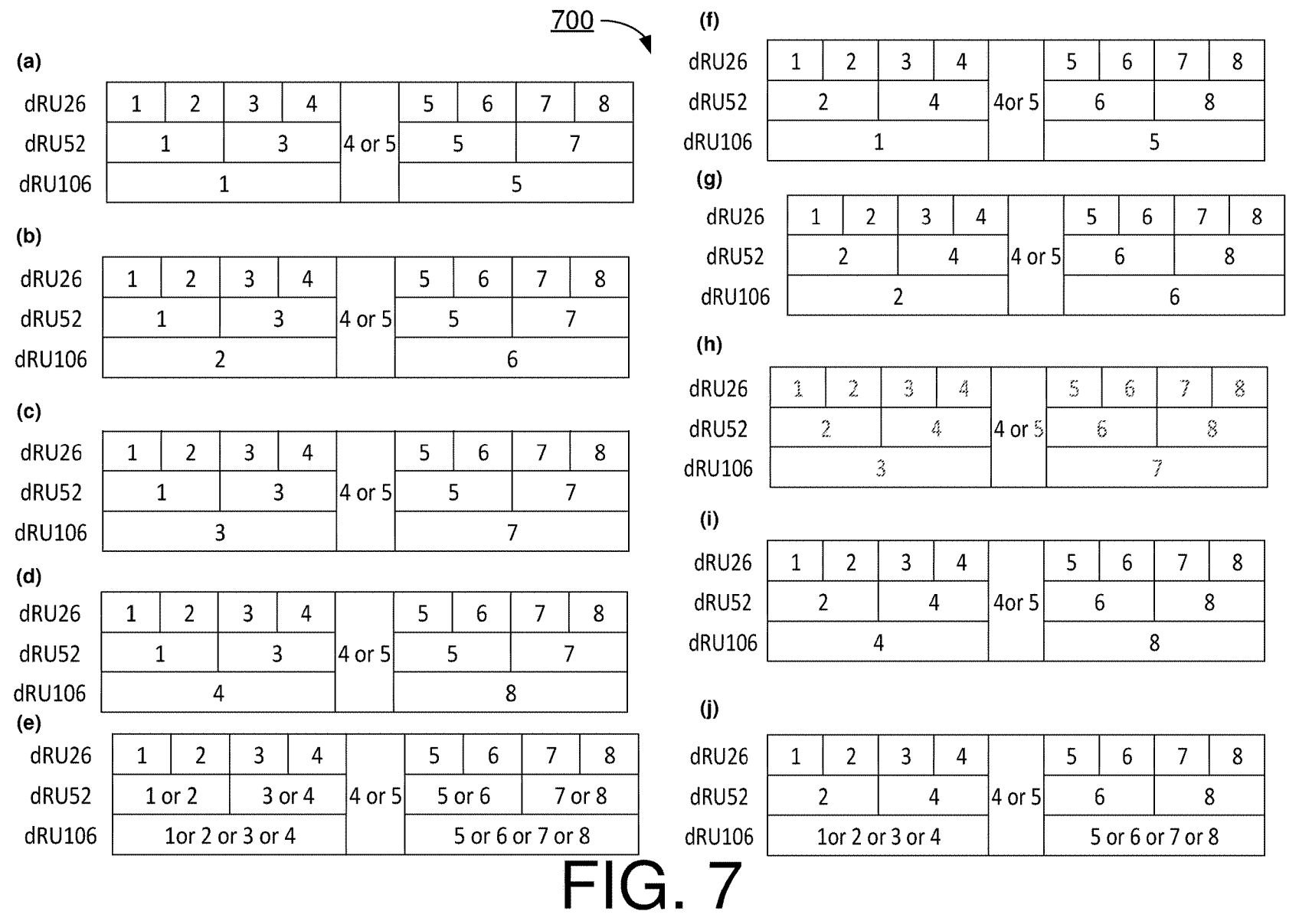
Figure 10:
FIG. 10 is a diagram of an example design under a proposed scheme in accordance with the present disclosure.

FIG. 7 illustrates an example design 700 under a proposed scheme in accordance with the present disclosure. Specifically, design 700 pertains to optimized global CSD index assignment for BW20 with maxNss=8. FIG. 8 illustrates an example design 800 under the proposed scheme. Specifically, design 800 is an extension of design 700 and pertains to optimized global CSD index assignment for BW20 with maxNss=8. In the upper portion of FIG. 8, an example of dRU logical indexes in a dRU hierarchical structure is shown for BW20, which may be similarly applied for BW40 and BW80. FIG. 9 illustrates an example design 900 under a proposed scheme in accordance with the present disclosure. Specifically, design 900 pertains to optimized global CSD index assignment for BW40 with maxNss=8. FIG. 10 illustrates an example design 1000 under the proposed scheme. Specifically, design 1000 is an extension of design 900 and pertains to optimized global CSD index assignment for BW40 with maxNss=8. FIG. 11 illustrates an example design 1100 under a proposed scheme in accordance with the present disclosure. Specifically, design 1100 pertains to optimized global CSD index assignment for BW80 with maxNss=8.

Figure 12:
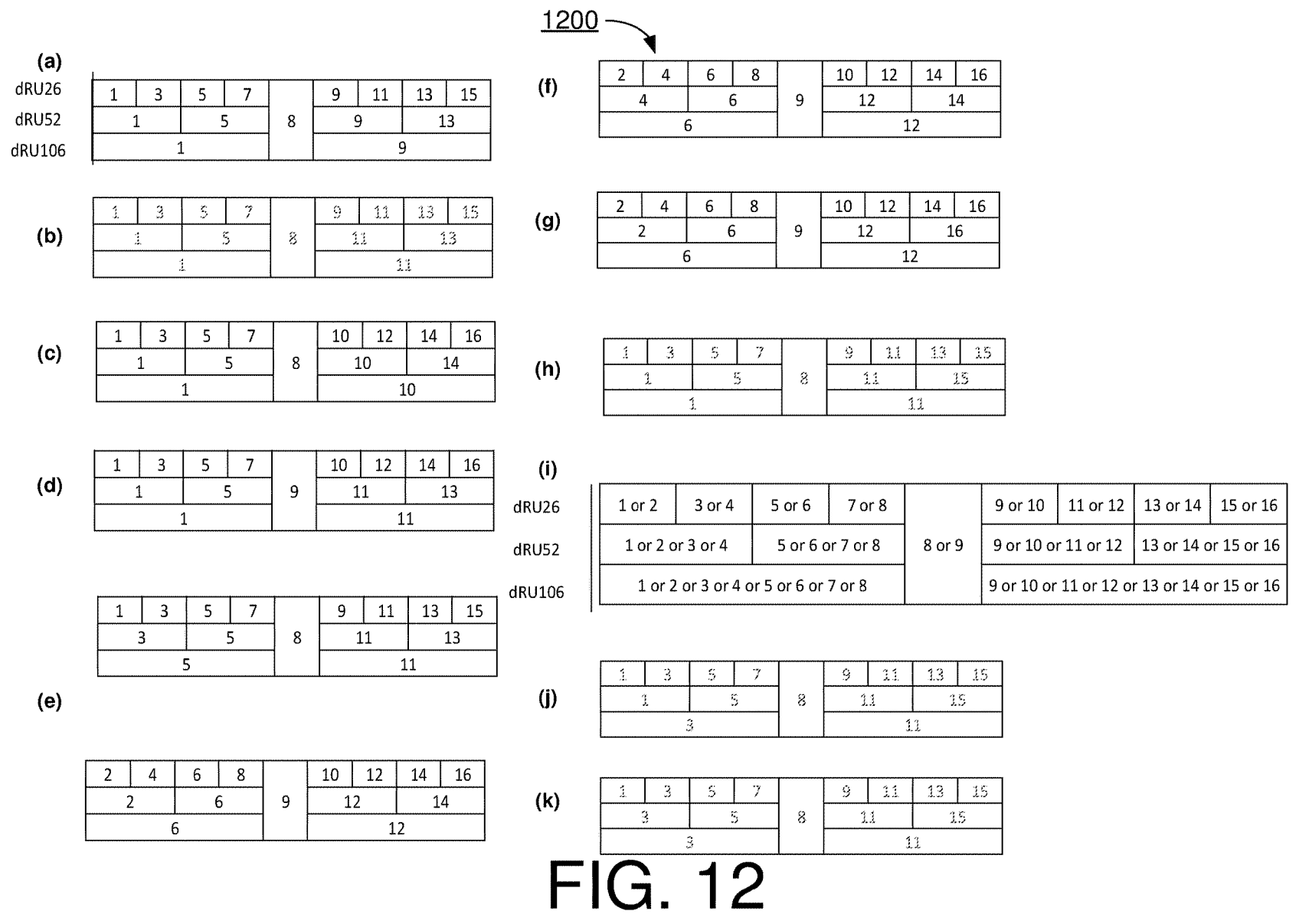
Figure 13:
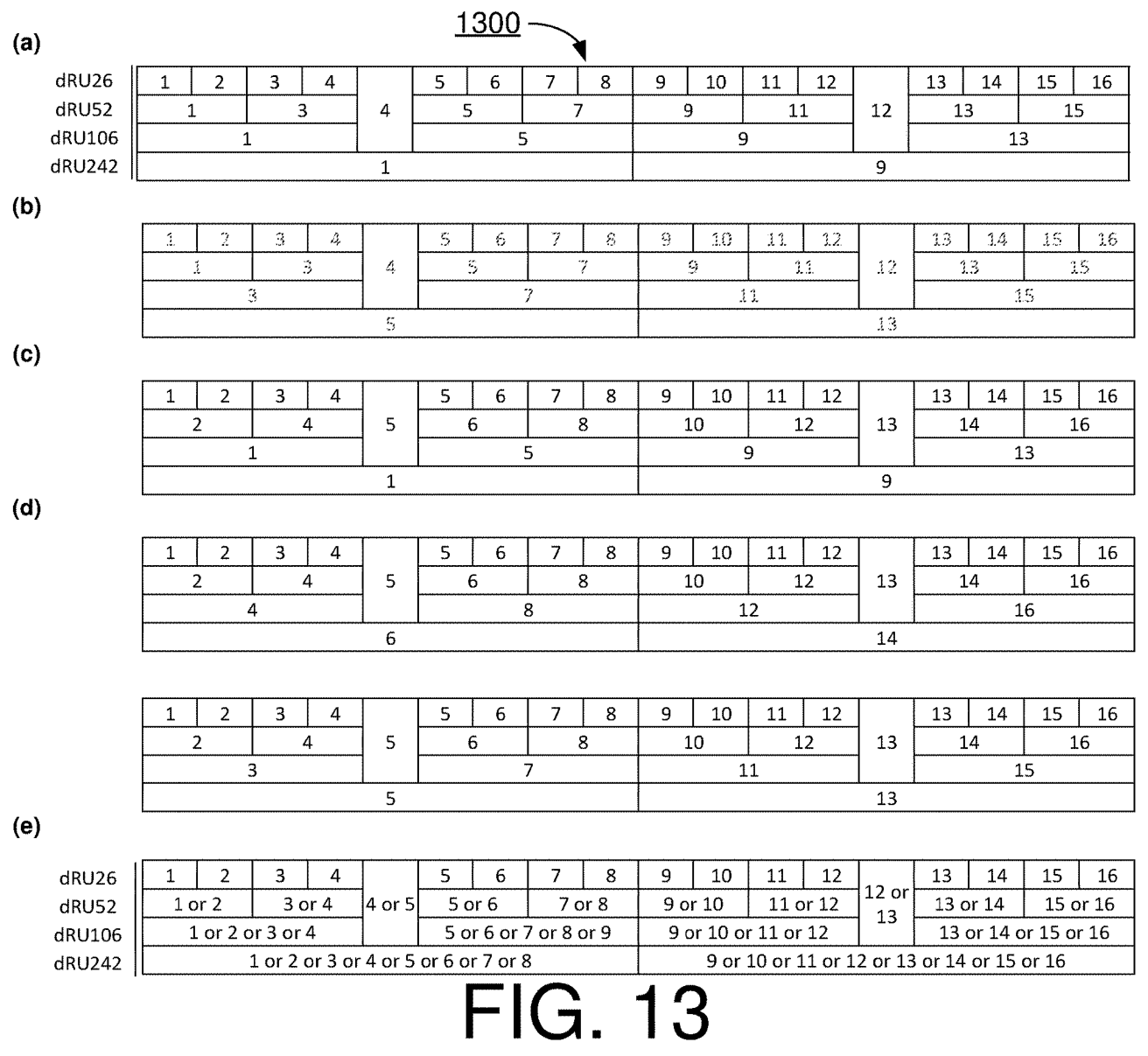
Figure 14:
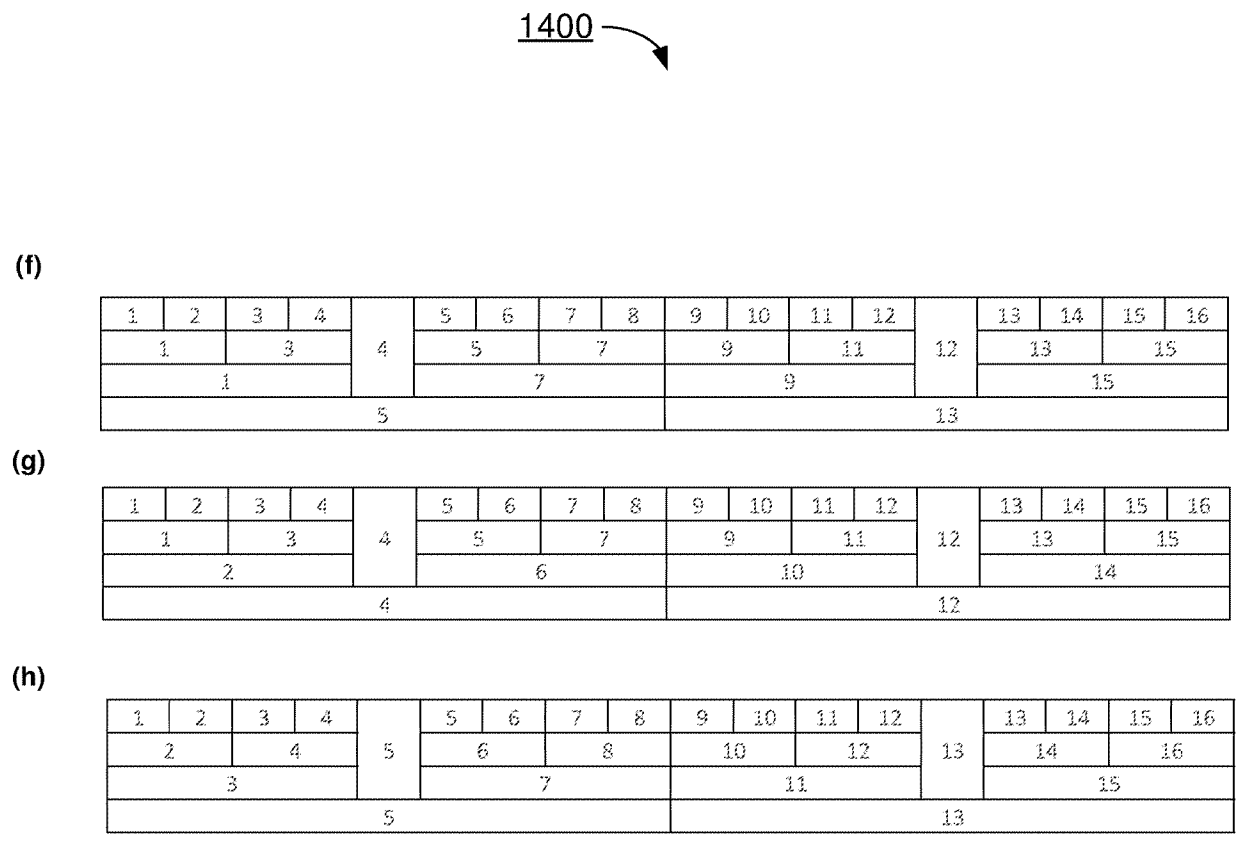
Figure 16:
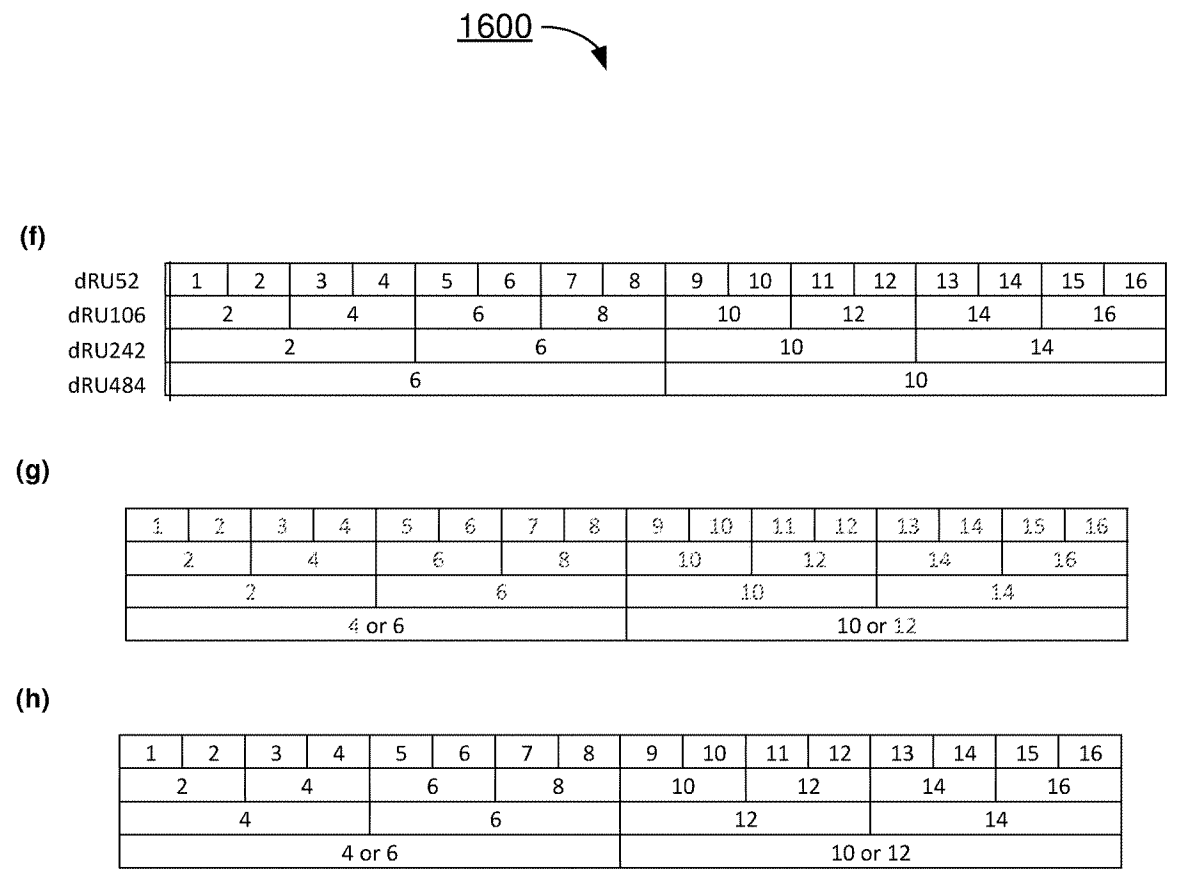

FIG. 12 illustrates an example design 1200 under a proposed scheme in accordance with the present disclosure. Specifically, design 1200 pertains to optimized global CSD index assignment for BW20 with maxNss=16. FIG. 13 illustrates an example design 1300 under a proposed scheme in accordance with the present disclosure. Specifically, design 1300 pertains to optimized global CSD index assignment for BW40 with maxNss=16. FIG. 14 illustrates an example design 1400 under the proposed scheme. Specifically, design 1400 is an extension of design 1300 and pertains to optimized global CSD index assignment for BW40 with maxNss=16. FIG. 15 illustrates an example design 1500 under a proposed scheme in accordance with the present disclosure. Specifically, design 1500 pertains to optimized global CSD index assignment for BW80 with maxNss=16. FIG. 16 illustrates an example design 1600 under the proposed scheme. Specifically, design 1600 is an extension of design 1500 and pertains to optimized global CSD index assignment for BW80 with maxNss=16.

Figure 17:
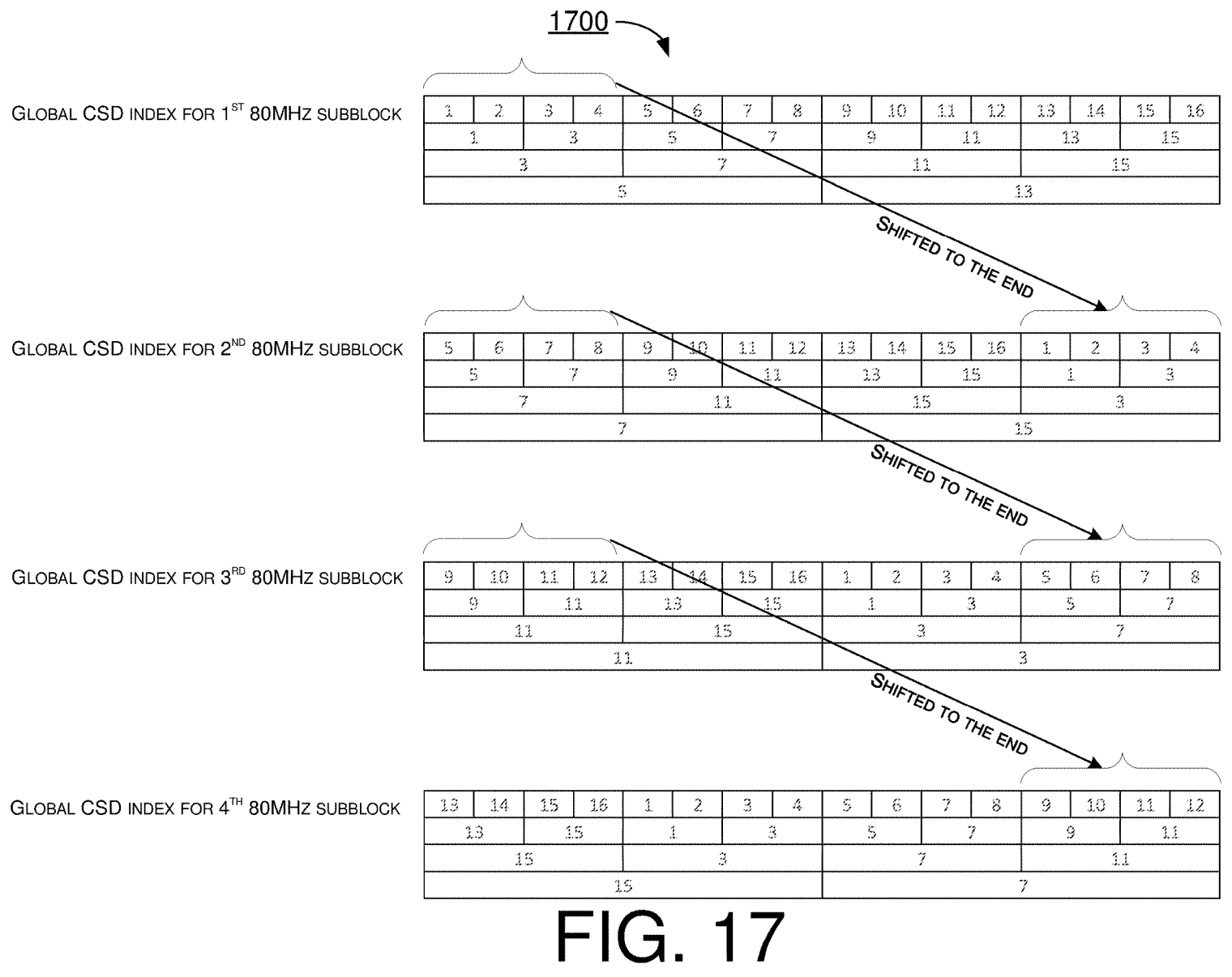

FIG. 17 illustrates an example scenario 1700 under a proposed scheme in accordance with the present disclosure. Specifically, scenario 1700 illustrates the concept of global CSD index assignment with circular shift. For instance, for BW80, maxNss=16 (or 16 CSD values). It is noteworthy that the entire global CSD index table may be grouped into two segments (or subblocks) for BW160 or four segments (or subblocks) for BW320. Additionally, each segment may correspond to per-80 MHz subblock. Moreover, the global CSD assignment index may be generated by circular shift of each segment (or subblock) as shown in scenario 1700. Furthermore, a similar circular shift operation/concept may be applied to global CSD index on BW20/40/80 with maxNss=8 or maxNss=16.

In view of the above, under various proposed schemes in accordance with the present disclosure, global CSD index assignment for EHT-STF of dRUs may be based on dRU index, and there may be up to 16 CSD values used for dRU STF transmissions with global CSD applied on EHT-STF but not other types of transmissions. Moreover, the global CSD index assignment design may be further optimized by evaluating the different assignments for all the dRU allocation combinations for both single-spatial stream (1ss) and double-spatial stream (2ss) scenarios. As described below, the optimized global CSD assignment design may achieve a number of benefits. For instance, the overall likelihood of collisions for 1ss and 2ss may be minimized. Additionally, the number of collisions for the worst-scenarios (e.g., four or five STAs sharing the same CSD) may be minimized. Furthermore, the similar CSD start index assignment structure for BW20/40/80 may be maintained.

FIG. 18 illustrates an example design 1800 under a proposed scheme in accordance with the present disclosure. Under the proposed scheme, a general structure of global CSD assignment may be adopted or utilized. Specifically, part (A) of FIG. 18 shows an example general structure of global CSD assignment for BW20, and part (B) of FIG. 18 shows an example general structure of global CSD assignment for BW40. In design 1800, it is assumed that there are 8 CSD values available for global CSD index assignment.

Figure 19:
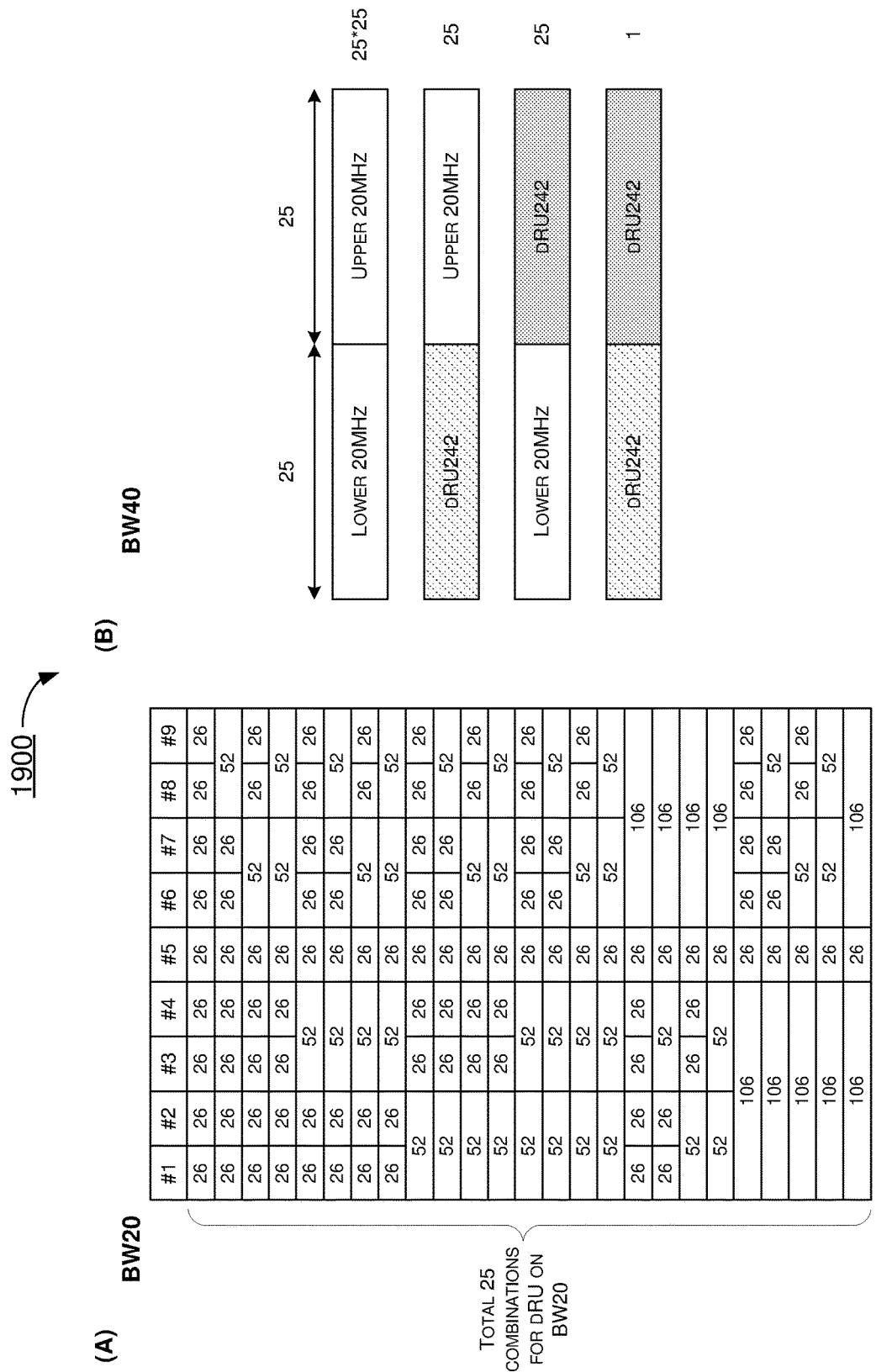
FIG. 19 is a diagram of an example design under a proposed scheme in accordance with the present disclosure.

FIG. 19 illustrates an example design 1900 under a proposed scheme in accordance with the present disclosure. Specifically, part (A) of FIG. 19 shows an example of dRU allocations on BW20, and part (B) of FIG. 19 shows an example of dRU allocations on BW40. Regarding the dRU allocations on BW20, there may be total 25 combinations for dRU on BW20. Regarding the dRU allocations on BW40, the total number of dRU allocation combinations may be: 25*25+2*25+1=676. It is noteworthy that, in design 1900, the total number of dRU allocation combinations for BW80 may be the same as for BW40.

There may be a number of factors that are considered, evaluated or otherwise compared for the global CSD assignment designs. For instance, one factor to be considered may pertain to the worst case or maximum number of STAs sharing the same CSD value for Nss=1 and Nss=2. Another factor to be considered may pertain to the total number of collisions over all the dRU allocation combinations for both Nss=1 and Nss=2. A further factor to be considered may pertain to the individual total number of collisions for scenarios of one-STA (no collision), two-STA, three-STA, four-STA and five-STA sharing the same CSD value. Still another factor to be considered may pertain to the structure of global CSD index assignment with implementation friendliness (e.g., ease and/or simplicity in implementation).

Figure 21:
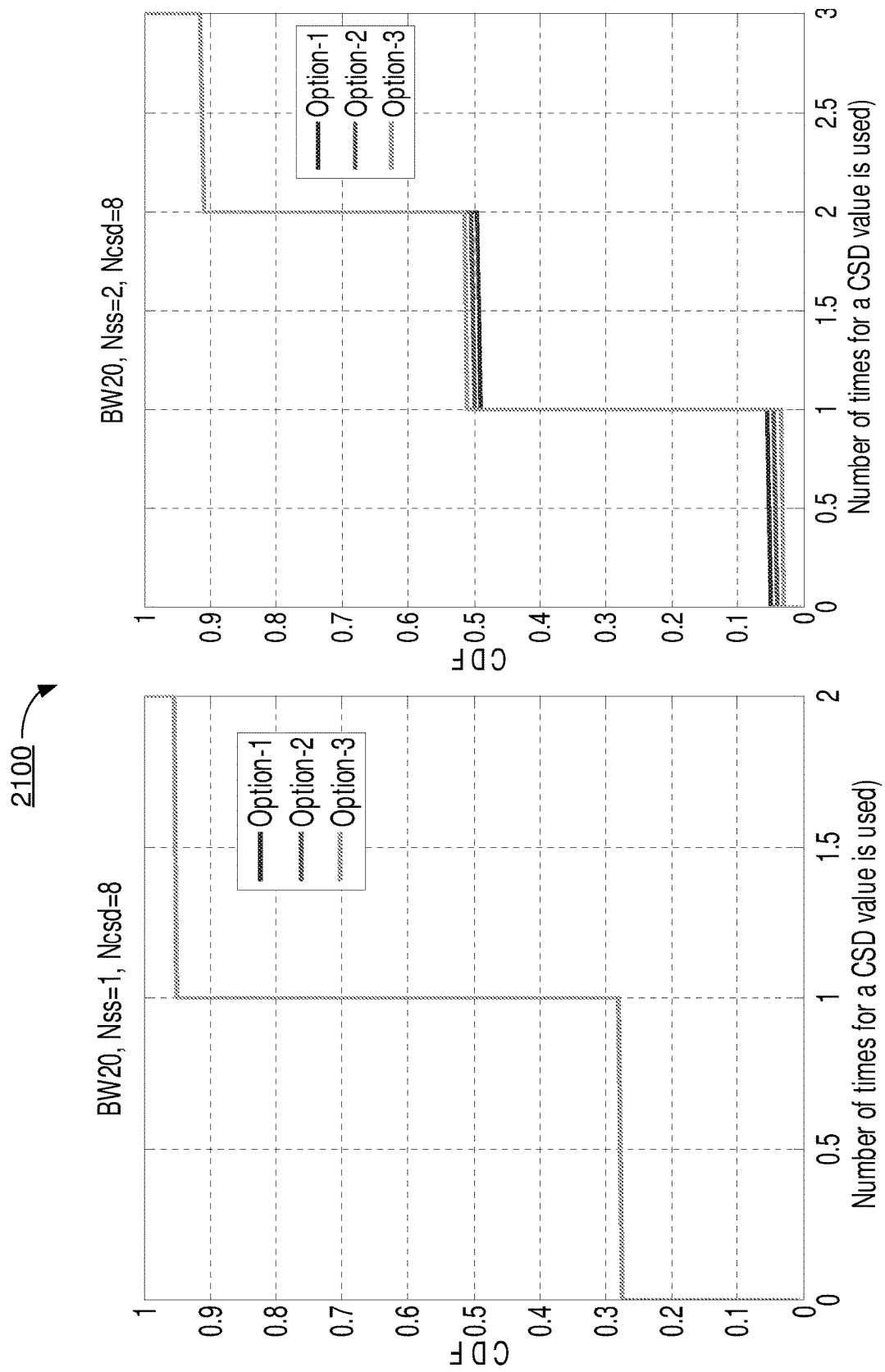
FIG. 21 is a diagram of an example scenario under a proposed scheme in accordance with the present disclosure.

FIG. 20 illustrates an example design 2000 under a proposed scheme in accordance with the present disclosure. Referring to FIG. 20, there are several options (Option-1, Option-2, Option-3 and Option-4) in design 2000 with respect to global CSD assignment design for BW20. FIG. 21 illustrates an example scenario 2100 of simulation results of Option-1, Option-2, Option-3 and Option-4 of design 2000 for BW20.

Figure 23:
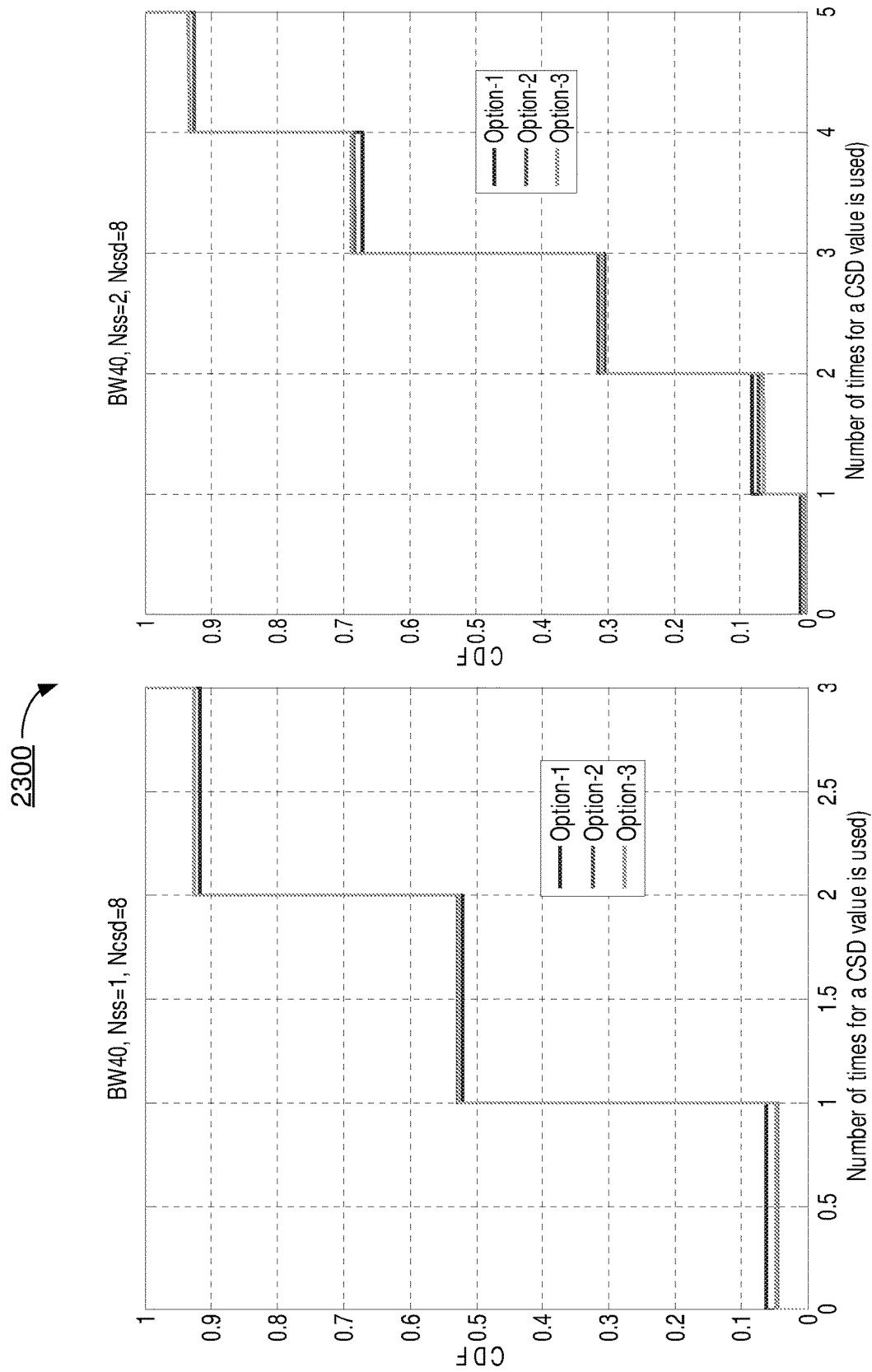
FIG. 23 is a diagram of an example scenario under a proposed scheme in accordance with the present disclosure.

FIG. 22 illustrates an example design 2200 under a proposed scheme in accordance with the present disclosure. Referring to FIG. 22, there are several options (Option-1, Option-2 and Option-3) in design 2200 with respect to global CSD assignment design for BW40. FIG. 23 illustrates an example scenario 2300 of simulation results of Option-1, Option-2 and Option-3 of design 2200 for BW40.

Figure 24:
FIG. 24 is a diagram of an example design under a proposed scheme in accordance with the present disclosure.
Figure 25:
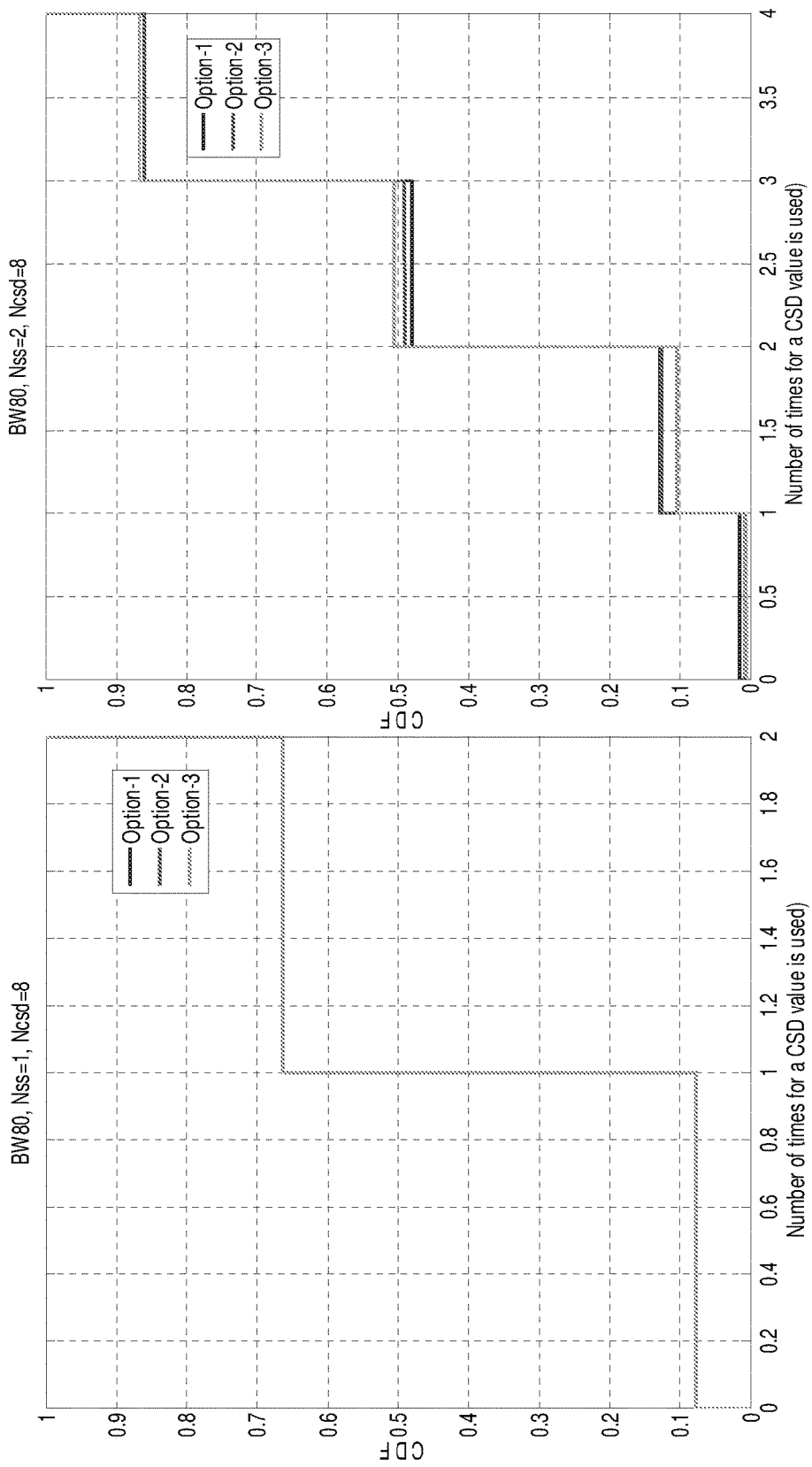
FIG. 25 is a diagram of an example scenario under a proposed scheme in accordance with the present disclosure.

FIG. 24 illustrates an example design 2400 under a proposed scheme in accordance with the present disclosure. Referring to FIG. 24, there are several options (Option-1, Option-2, Option-3 and Option-4) in design 2400 with respect to global CSD assignment design for BW80. FIG. 25 illustrates an example scenario 2500 of simulation results of Option-1, Option-2, Option-3 and Option-4 of design 2400 for BW80.

FIG. 26 illustrates an example design 2600 under a proposed scheme in accordance with the present disclosure. Referring to FIG. 26, global CSD assignment for each of BW20, BW40 and BW80 under Option-1 is shown. FIG. 27 illustrates an example design 2700 under the proposed scheme. Referring to FIG. 27, a table of global CSD starting index assignment for each of BW20, BW40 and BW80 under Option-1 is shown.

Figure 28:
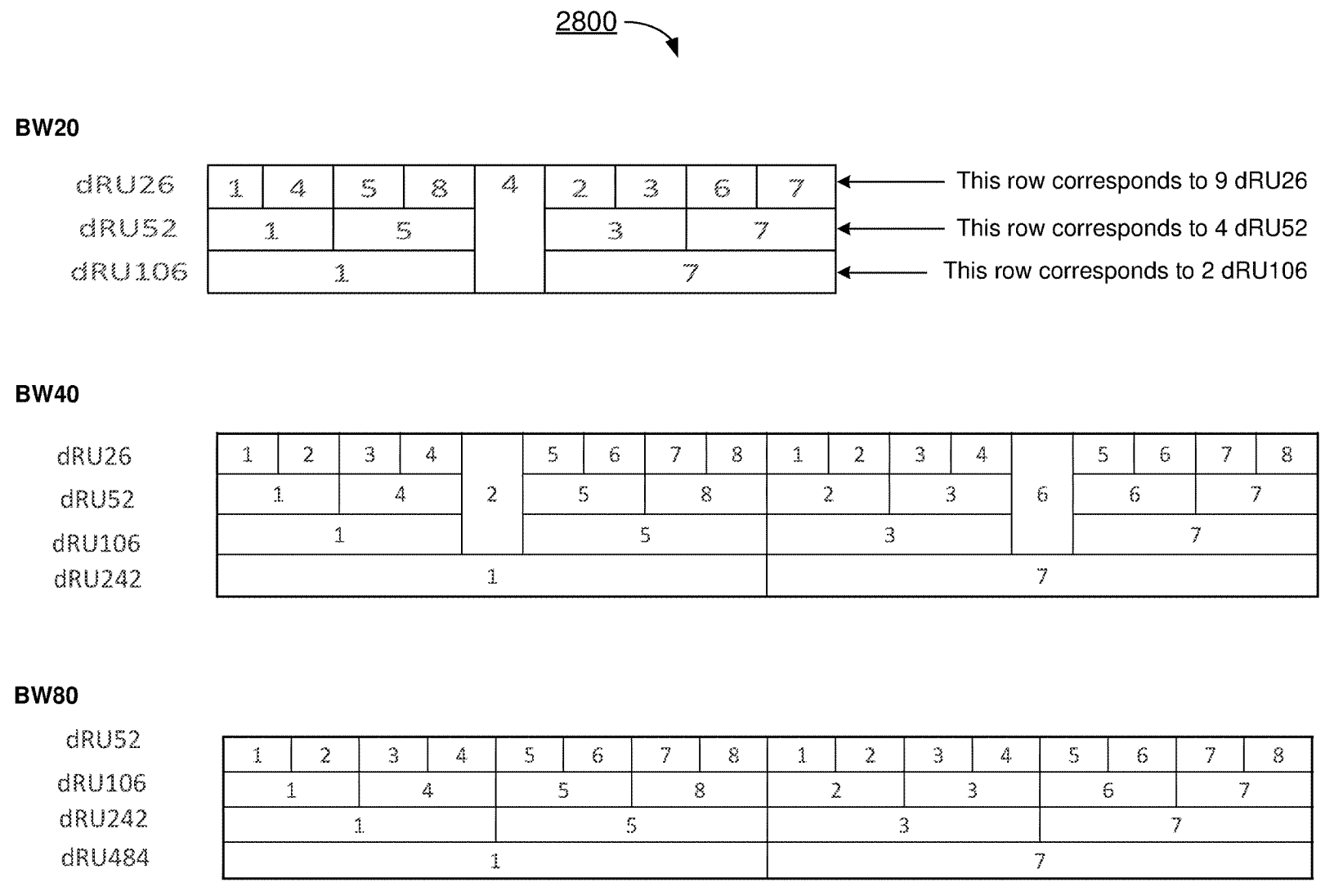

FIG. 28 illustrates an example design 2800 under a proposed scheme in accordance with the present disclosure. Referring to FIG. 28, global CSD assignment for each of BW20, BW40 and BW80 under Option-2 is shown. FIG. 29 illustrates an example design 2900 under the proposed scheme. Referring to FIG. 29, a table of global CSD starting index assignment for each of BW20, BW40 and BW80 under Option-2 is shown.

Figure 30:
FIG. 30 is a diagram of an example design under a proposed scheme in accordance with the present disclosure.

FIG. 30 illustrates an example design 3000 under a proposed scheme in accordance with the present disclosure. Referring to FIG. 30, global CSD assignment for each of BW20, BW40 and BW80 under Option-3 is shown. FIG. 31 illustrates an example design 3100 under the proposed scheme. Referring to FIG. 31, a table of global CSD starting index assignment for each of BW20, BW40 and BW80 under Option-3 is shown.

Figure 32:
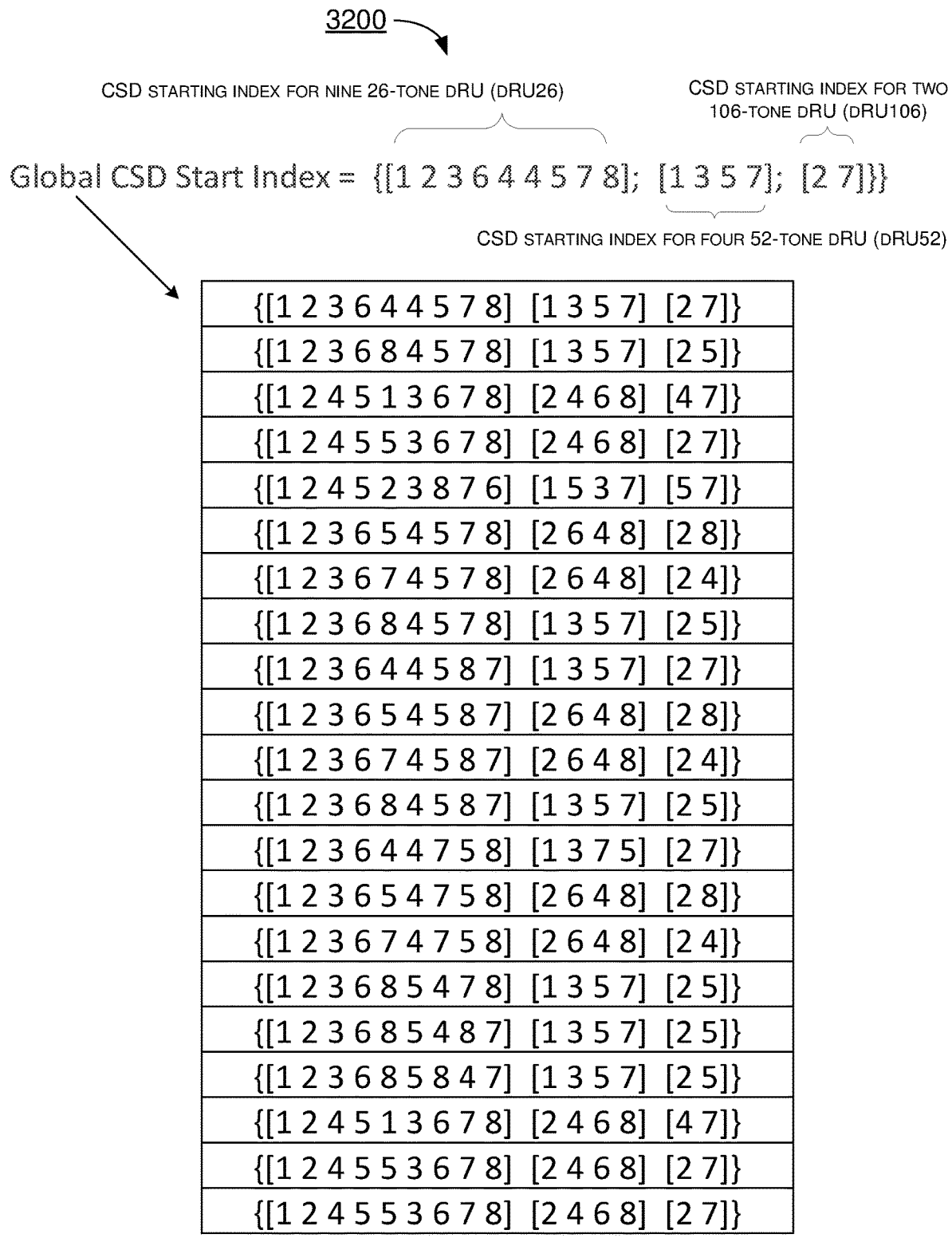
FIG. 32 is a diagram of an example design under a proposed scheme in accordance with the present disclosure.

FIG. 32 illustrates an example design 3200 under a proposed scheme in accordance with the present disclosure. Referring to FIG. 32, global CSD assignment for BW20 is shown. FIG. 33 illustrates an example design 3300 under the proposed scheme. Referring to FIG. 33, updates on the global CSD assignment for BW20 are shown.

Figure 34:
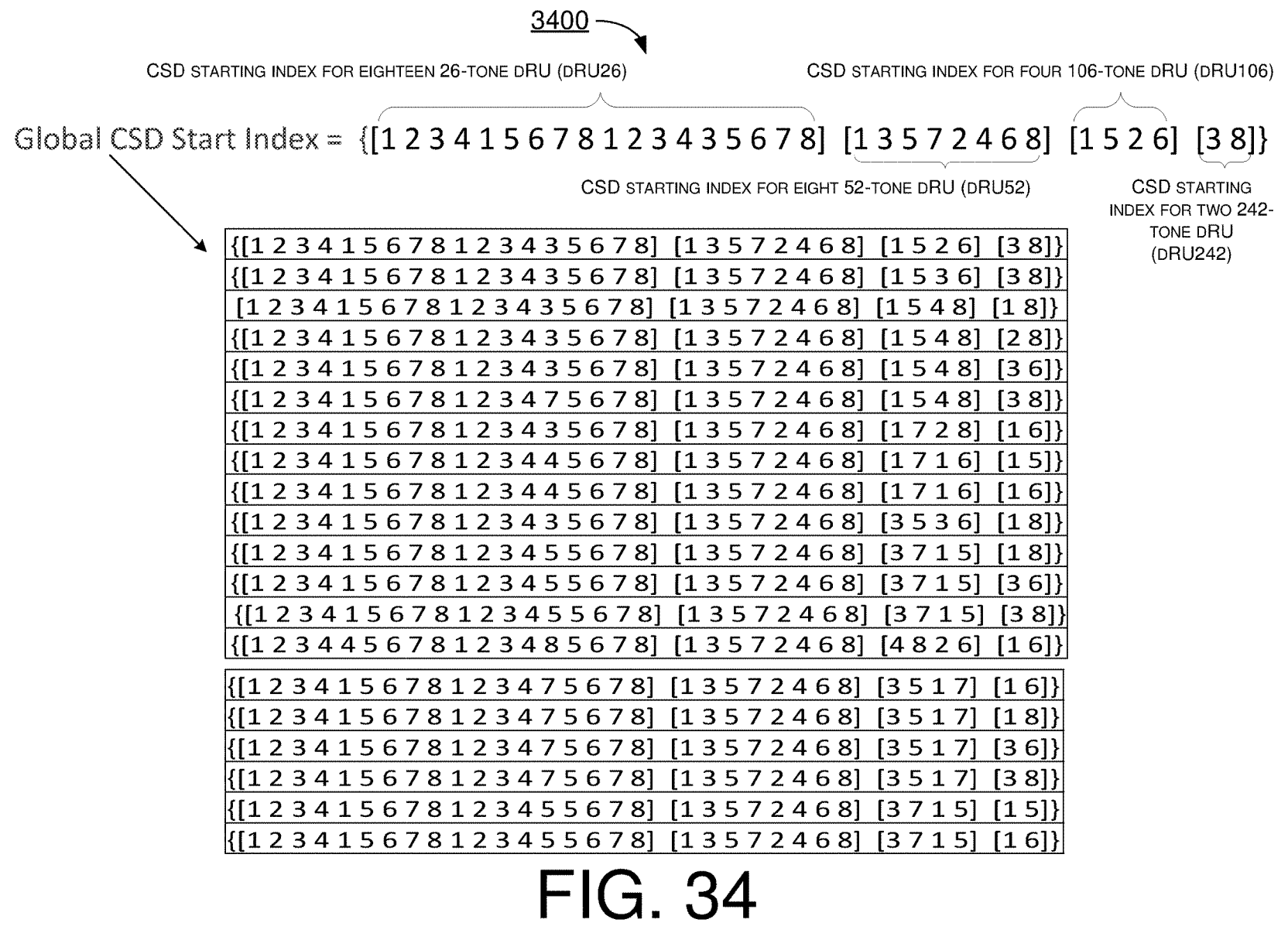

FIG. 34 illustrates an example design 3400 under a proposed scheme in accordance with the present disclosure. Referring to FIG. 34, global CSD assignment for BW40 is shown. FIG. 35 and FIG. 36 illustrate example design 3500 and example design 3600, respectively, under the proposed scheme. Referring to FIG. 35 and FIG. 36, updates on the global CSD assignment for BW40 are shown.

Figure 37:
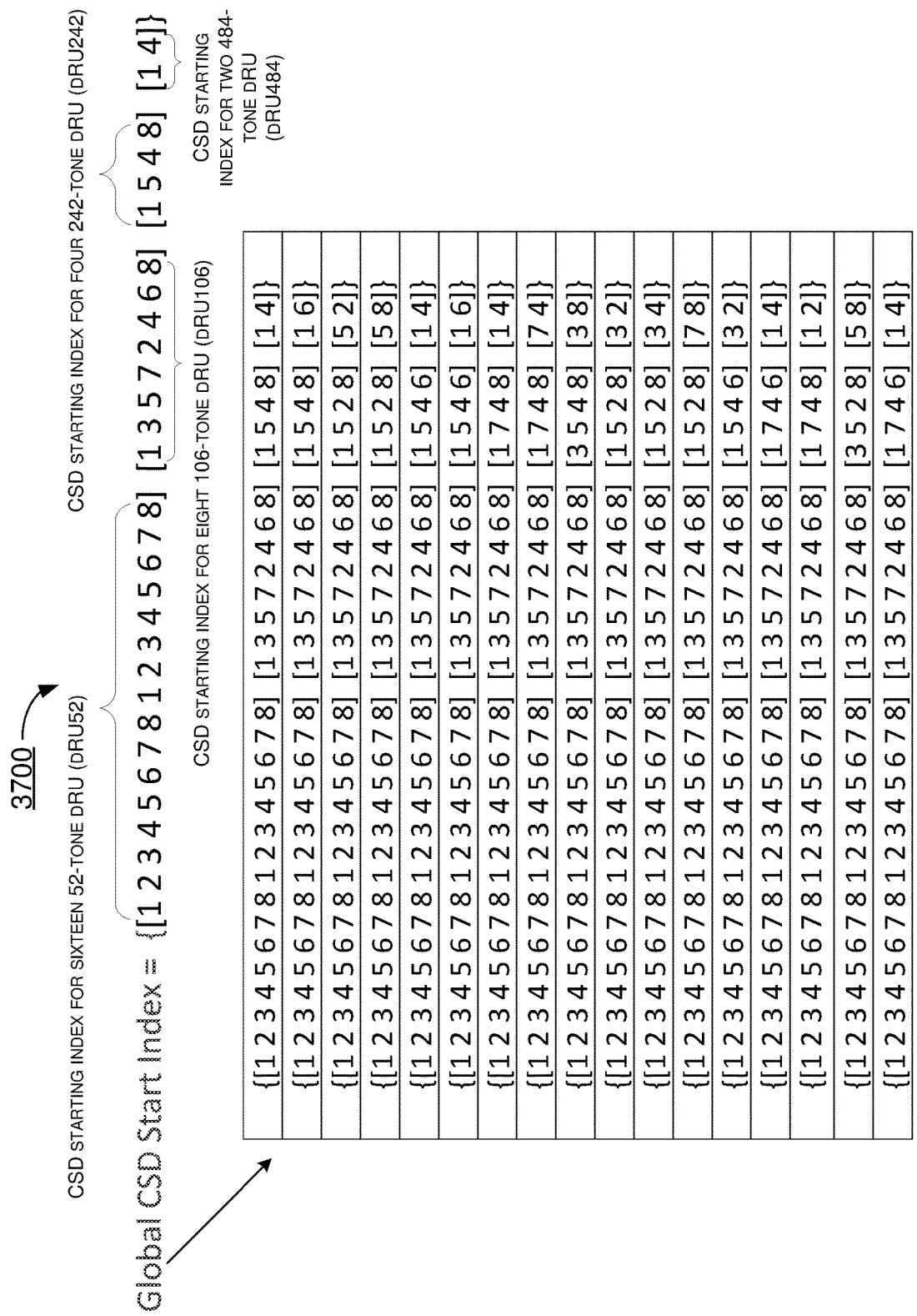
FIG. 37 is a diagram of an example design under a proposed scheme in accordance with the present disclosure.

FIG. 37 illustrates an example design 3700 under a proposed scheme in accordance with the present disclosure. Referring to FIG. 37, global CSD assignment for BW80 is shown. FIG. 38 and FIG. 39 illustrate example design 3800 and example design 3900, respectively, under the proposed scheme. Referring to FIG. 38 and FIG. 39, updates on the global CSD assignment for BW80 are shown.

Illustrative Implementations

FIG. 40 illustrates an example system 4000 having at least an example apparatus 4010 and an example apparatus 4020 in accordance with an implementation of the present disclosure. Each of apparatus 4010 and apparatus 4020 may perform various functions to implement schemes, techniques, processes and methods described herein pertaining to global CSD assignment for dRU transmissions in wireless communications, including the various schemes described above with respect to various proposed designs, concepts, schemes, systems and methods described above as well as processes described below. For instance, apparatus 4010 may be an example implementation of communication entity 110, and apparatus 4020 may be an example implementation of communication entity 120.

Each of apparatus 4010 and apparatus 4020 may be a part of an electronic apparatus, which may be a STA or an AP, such as a portable or mobile apparatus, a wearable apparatus, a wireless communication apparatus or a computing apparatus. For instance, each of apparatus 4010 and apparatus 4020 may be implemented in a smartphone, a smart watch, a personal digital assistant, a digital camera, or a computing equipment such as a tablet computer, a laptop computer or a notebook computer. Each of apparatus 4010 and apparatus 4020 may also be a part of a machine type apparatus, which may be an IoT apparatus such as an immobile or a stationary apparatus, a home apparatus, a wire communication apparatus or a computing apparatus. For instance, each of apparatus 4010 and apparatus 4020 may be implemented in a smart thermostat, a smart fridge, a smart door lock, a wireless speaker or a home control center. When implemented in or as a network apparatus, apparatus 4010 and/or apparatus 4020 may be implemented in a network node, such as an AP in a WLAN.

In some implementations, each of apparatus 4010 and apparatus 4020 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. In the various schemes described above, each of apparatus 4010 and apparatus 4020 may be implemented in or as a STA or an AP. Each of apparatus 4010 and apparatus 4020 may include at least some of those components shown in FIG. 40 such as a processor 4012 and a processor 4022, respectively, for example. Each of apparatus 4010 and apparatus 4020 may further include one or more other components not pertinent to the proposed scheme of the present disclosure (e.g., internal power supply, display device and/or user interface device), and, thus, such component(s) of apparatus 4010 and apparatus 4020 are neither shown in FIG. 40 nor described below in the interest of simplicity and brevity.

In one aspect, each of processor 4012 and processor 4022 may be implemented in the form of one or more single-core processors, one or more multi-core processors, one or more RISC processors or one or more CISC processors. That is, even though a singular term "a processor" is used herein to refer to processor 4012 and processor 4022, each of processor 4012 and processor 4022 may include multiple processors in some implementations and a single processor in other implementations in accordance with the present disclosure. In another aspect, each of processor 4012 and processor 4022 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 4012 and processor 4022 is a special-purpose machine specifically designed, arranged and configured to perform specific tasks including those pertaining to global CSD assignment for dRU transmissions in wireless communications in accordance with various implementations of the present disclosure. For instance, each of processor 4012 and processor 4022 may be configured with hardware components, or circuitry, implementing one, some or all of the examples described and illustrated herein.

In some implementations, apparatus 4010 may also include a transceiver 4016 coupled to processor 4012. Transceiver 4016 may be capable of wirelessly transmitting and receiving data. In some implementations, apparatus 4020 may also include a transceiver 4026 coupled to processor

4022. Transceiver 4026 may include a transceiver capable of wirelessly transmitting and receiving data.

In some implementations, apparatus 4010 may further include a memory 4014 coupled to processor 4012 and capable of being accessed by processor 4012 and storing data therein. In some implementations, apparatus 4020 may further include a memory 4024 coupled to processor 4022 and capable of being accessed by processor 4022 and storing data therein. Each of memory 4014 and memory 4024 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 4014 and memory 4024 may include a type of read-only memory (ROM) such as mask ROM, programmable ROM (PROM), erasable programmable ROM (EPROM) and/or electrically erasable programmable ROM (EEPROM). Alternatively, or additionally, each of memory 4014 and memory 4024 may include a type of non-volatile random-access memory (NVRAM) such as flash memory, solid-state memory, ferroelectric RAM (FeRAM), magnetoresistive RAM (MRAM) and/or phase-change memory.

Each of apparatus 4010 and apparatus 4020 may be a communication entity capable of communicating with each other using various proposed schemes in accordance with the present disclosure. For illustrative purposes and without limitation, a description of capabilities of apparatus 4010, as communication entity 110, and apparatus 4020, as communication entity 120, is provided below. It is noteworthy that, although the example implementations described below are provided in the context of WLAN, the same may be implemented in other types of networks. Thus, although the following description of example implementations pertains to a scenario in which apparatus 4010 functions as a transmitting device and apparatus 4020 functions as a receiving device, the same is also applicable to another scenario in which apparatus 4010 functions as a receiving device and apparatus 4020 functions as a transmitting device.

Under a proposed scheme in accordance with the present disclosure with respect to global CSD assignment for dRU transmissions in wireless communications, processor 4012 of apparatus 4010 may apply a CSD index assignment in distributing a plurality of subcarriers of a RU over a bandwidth to generate an EHT-STF of a dRU. The CSD index assignment may be based on a dRU hierarchical structure with one or more CSD indexes shared among multiple dRUs of different sizes but not among multiple dRUs of a same size. Moreover, processor 4012 may transmit, via transceiver 4016, symbols of the EHT-STF of the dRU to apparatus 4020.

In some implementations, in applying the CSD index assignment, processor 4012 may apply the CSD index assignment for a maximum number of spatial streams (maxNss) equal to 8 or 16.

In some implementations, the bandwidth may be 20 MHz, and the maximum number of spatial streams (maxNss) may equal to 16. In such cases, a per-dRU26 CSD starting index may include one of [1 3 5 7 8 9 11 13 15], a per-dRU52 CSD starting index may include one of [1 5 9 13], and a per-dRU106 CSD starting index may include one of [1 9].

In some implementations, the bandwidth may be 40 MHz, and the maximum number of spatial streams (maxNss) may equal to 16. In such cases, a per-dRU26 CSD starting index may include one of [1 2 3 4 4 5 6 7 8 9 10 11 12 13 14 15 16], a per-dRU52 CSD starting index may include one of [1 3 5 7 9 11 13 15], a per-dRU106 CSD starting index may include one of [1 5 9 13], and a per-dRU242 CSD starting index comprises one of [1 9].

In some implementations, the bandwidth may be 80 MHz, and the maximum number of spatial streams (maxNss) may equal to 16. In such cases, a per-dRU52 CSD starting index may include one of [1 2 3 4 5 6 7 8 9 10 11 12 13 14 15 16], a per-dRU106 CSD starting index may include one of [1 3 5 7 9 11 13 15], a per-dRU242 CSD starting index may include one of [1 5 9 13], and a per-dRU484 CSD starting index may be one of [1 9].

In some implementations, the bandwidth may be 20 MHz, and the maximum number of spatial streams (maxNss) may equal to 8. In such cases, a per-dRU26 CSD starting index may include one of [1 2 3 4 5 5 6 7 8], a per-dRU52 CSD starting index may include one of [2 4 6 8], and a per-dRU106 CSD starting index may include one of [3 7].

In some implementations, the bandwidth may be 40 MHz, and the maximum number of spatial streams (maxNss) may equal to 8. In such cases, a per-dRU26 CSD starting index may include one of [1 5 2 6 3 3 7 4 8 1 5 2 6 7 3 7 4 8], a per-dRU52 CSD starting index may include one of [1 2 3 4 5 6 7 8], a per-dRU106 CSD starting index may include one of [2 4 6 8], and a per-dRU242 CSD starting index may include one of [3 7].

In some implementations, the bandwidth may be 80 MHz, and the maximum number of spatial streams (maxNss) may equal to 8. In such cases, a per-dRU52 CSD starting index may include one of [1 5 2 6 3 7 4 8 1 5 2 6 3 7 4 8], a per-dRU106 CSD starting index may include one of [1 2 3 4 5 6 7 8], a per-dRU242 CSD starting index may include one of [2 4 6 8], and a per-dRU484 CSD starting index may include one of [3 7].

In some implementations, the bandwidth may be 20 MHz, and the maximum number of spatial streams (maxNss) may equal to 8. In such cases, a per-dRU26 CSD starting index may include one of [1 2 3 4 4 5 6 7 8], a per-dRU52 CSD starting index may include one of [1 3 5 7], and a per-dRU106 CSD starting index may include one of [1 6].

In some implementations, the bandwidth may be 40 MHz, and the maximum number of spatial streams (maxNss) may equal to 8. In such cases, a per-dRU26 CSD starting index may include one of [1 2 3 4 1 5 6 7 8 1 2 3 4 4 5 6 7 8], a per-dRU52 CSD starting index may include one of [1 3 5 7 2 4 6 8], a per-dRU106 CSD starting index may include one of [1 5 2 6], and a per-dRU242 CSD starting index may include one of [1 6].

In some implementations, the bandwidth may be 80 MHz, and the maximum number of spatial streams (maxNss) may equal to 8. In such cases, a per-dRU52 CSD starting index comprises one of [1 2 3 4 5 6 7 8 1 2 3 4 5 6 7 8], a per-dRU106 CSD starting index may include one of [1 3 5 7 2 4 6 8], a per-dRU242 CSD starting index may include one of [1 5 2 6], and a per-dRU484 CSD starting index may include one of [1 6].

In some implementations, the bandwidth may be 20 MHz, and the maximum number of spatial streams (maxNss) may equal to 8. In such cases, a per-dRU26 CSD starting index may include one of [1 4 5 8 4 2 3 6 7], a per-dRU52 CSD starting index may include one of [1 5 3 7], and a per-dRU106 CSD starting index may include one of [1 7].

In some implementations, the bandwidth may be 40 MHz, and the maximum number of spatial streams (maxNss) may equal to 8. In such cases, a per-dRU26 CSD starting index may include one of [1 2 3 4 2 5 6 7 8 1 2 3 4 6 5 6 7 8], a per-dRU52 CSD starting index may include one of [1 4 5 8

2 3 6 7], a per-dRU106 CSD starting index may include one of [1 5 3 7], and a per-dRU242 CSD starting index may include one of [1 7].

In some implementations, the bandwidth may be 80 MHz, and the maximum number of spatial streams (maxNss) may equal to 8. In such cases, a per-dRU52 CSD starting index may include one of [1 2 3 4 5 6 7 8 1 2 3 4 5 6 7 8], a per-dRU106 CSD starting index may include one of [1 4 5 8 2 3 6 7], a per-dRU242 CSD starting index may include one of [1 5 3 7], and a per-dRU484 CSD starting index may include one of [1 7].

Illustrative Processes

FIG. 41 illustrates an example process 4100 in accordance with an implementation of the present disclosure. Process 4100 may represent an aspect of implementing various proposed designs, concepts, schemes, systems and methods described above. More specifically, process 4100 may represent an aspect of the proposed concepts and schemes pertaining to global CSD assignment for dRU transmissions in wireless communications in accordance with the present disclosure. Process 4100 may include one or more operations, actions, or functions as illustrated by one or more of blocks 4110 and 4120. Although illustrated as discrete blocks, various blocks of process 4100 may be divided into additional blocks, combined into fewer blocks, or eliminated, depending on the desired implementation. Moreover, the blocks/sub-blocks of process 4100 may be executed in the order shown in FIG. 41 or, alternatively in a different order. Furthermore, one or more of the blocks/sub-blocks of process 4100 may be executed repeatedly or iteratively. Process 4100 may be implemented by or in apparatus 4010 and apparatus 4020 as well as any variations thereof. Solely for illustrative purposes and without limiting the scope, process 4100 is described below in the context of apparatus 4010 as communication entity 110 (e.g., a transmitting device whether a STA or an AP) and apparatus 4020 as communication entity 120 (e.g., a receiving device whether a STA or an AP) of a wireless network such as a WLAN in accordance with one or more of IEEE 802.11 standards. Process 4100 may begin at block 4110.

At 4110, process 4100 may involve processor 4012 of apparatus 4010 applying a CSD index assignment in distributing a plurality of subcarriers of a RU over a bandwidth to generate an EHT-STF of a dRU. The CSD index assignment may be based on a dRU hierarchical structure with one or more CSD indexes shared among multiple dRUs of different sizes but not among multiple dRUs of a same size. Process 4100 may proceed from 4110 to 4120.

At 4120, process 4100 may involve processor 4012 transmitting, via transceiver 4016, symbols of the EHT-STF of the dRU to apparatus 4020.

In some implementations, in applying the CSD index assignment, process 4100 may involve processor 4012 applying the CSD index assignment for a maximum number of spatial streams (maxNss) equal to 8 or 16.

In some implementations, the bandwidth may be 20 MHz, and the maximum number of spatial streams (maxNss) may equal to 16. In such cases, a per-dRU26 CSD starting index may include one of [1 3 5 7 8 9 11 13 15], a per-dRU52 CSD starting index may include one of [1 5 9 13], and a per-dRU106 CSD starting index may include one of [1 9].

In some implementations, the bandwidth may be 40 MHz, and the maximum number of spatial streams (maxNss) may equal to 16. In such cases, a per-dRU26 CSD starting index may include one of [1 2 3 4 4 5 6 7 8 9 10 11 12 13 14 15 16], a per-dRU52 CSD starting index may include one of [1 3 5 7 9 11 13 15], a per-dRU106 CSD starting index may include one of [1 5 9 13], and a per-dRU242 CSD starting index comprises one of [1 9].

In some implementations, the bandwidth may be 80 MHz, and the maximum number of spatial streams (maxNss) may equal to 16. In such cases, a per-dRU52 CSD starting index may include one of [1 2 3 4 5 6 7 8 9 10 11 12 13 14 15 16], a per-dRU106 CSD starting index may include one of [1 3 5 7 9 11 13 15], a per-dRU242 CSD starting index may include one of [1 5 9 13], and a per-dRU484 CSD starting index may be one of [1 9].

In some implementations, the bandwidth may be 20 MHz, and the maximum number of spatial streams (maxNss) may equal to 8. In such cases, a per-dRU26 CSD starting index may include one of [1 2 3 4 5 5 6 7 8], a per-dRU52 CSD starting index may include one of [2 4 6 8], and a per-dRU106 CSD starting index may include one of [3 7].

In some implementations, the bandwidth may be 40 MHz, and the maximum number of spatial streams (maxNss) may equal to 8. In such cases, a per-dRU26 CSD starting index may include one of [1 5 2 6 3 3 7 4 8 1 5 2 6 7 3 7 4 8], a per-dRU52 CSD starting index may include one of [1 2 3 4 5 6 7 8], a per-dRU106 CSD starting index may include one of [2 4 6 8], and a per-dRU242 CSD starting index may include one of [3 7].

In some implementations, the bandwidth may be 80 MHz, and the maximum number of spatial streams (maxNss) may equal to 8. In such cases, a per-dRU52 CSD starting index may include one of [1 5 2 6 3 7 4 8 1 5 2 6 3 7 4 8], a per-dRU106 CSD starting index may include one of [1 2 3 4 5 6 7 8], a per-dRU242 CSD starting index may include one of [2 4 6 8], and a per-dRU484 CSD starting index may include one of [3 7].

In some implementations, the bandwidth may be 20 MHz, and the maximum number of spatial streams (maxNss) may equal to 8. In such cases, a per-dRU26 CSD starting index may include one of [1 2 3 4 4 5 6 7 8], a per-dRU52 CSD starting index may include one of [1 3 5 7], and a per-dRU106 CSD starting index may include one of [1 6].

In some implementations, the bandwidth may be 40 MHz, and the maximum number of spatial streams (maxNss) may equal to 8. In such cases, a per-dRU26 CSD starting index may include one of [1 2 3 4 1 5 6 7 8 1 2 3 4 4 5 6 7 8], a per-dRU52 CSD starting index may include one of [1 3 5 7 2 4 6 8], a per-dRU106 CSD starting index may include one of [1 5 2 6], and a per-dRU242 CSD starting index may include one of [1 6].

In some implementations, the bandwidth may be 80 MHz, and the maximum number of spatial streams (maxNss) may equal to 8. In such cases, a per-dRU52 CSD starting index comprises one of [1 2 3 4 5 6 7 8 1 2 3 4 5 6 7 8], a per-dRU106 CSD starting index may include one of [1 3 5 7 2 4 6 8], a per-dRU242 CSD starting index may include one of [1 5 2 6], and a per-dRU484 CSD starting index may include one of [1 6].

In some implementations, the bandwidth may be 20 MHz, and the maximum number of spatial streams (maxNss) may equal to 8. In such cases, a per-dRU26 CSD starting index may include one of [1 4 5 8 4 2 3 6 7], a per-dRU52 CSD starting index may include one of [1 5 3 7], and a per-dRU106 CSD starting index may include one of [1 7].

In some implementations, the bandwidth may be 40 MHz, and the maximum number of spatial streams (maxNss) may equal to 8. In such cases, a per-dRU26 CSD starting index may include one of [1 2 3 4 2 5 6 7 8 1 2 3 4 6 5 6 7 8], a per-dRU52 CSD starting index may include one of [1 4 5 8

2 3 6 7], a per-dRU106 CSD starting index may include one of [1 5 3 7], and a per-dRU242 CSD starting index may include one of [1 7].

In some implementations, the bandwidth may be 80 MHz, and the maximum number of spatial streams (maxNss) may equal to 8. In such cases, a per-dRU52 CSD starting index may include one of [1 2 3 4 5 6 7 8 1 2 3 4 5 6 7 8], a per-dRU106 CSD starting index may include one of [1 4 5 8 2 3 6 7], a per-dRU242 CSD starting index may include one of [1 5 3 7], and a per-dRU484 CSD starting index may include one of [1 7].

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
applying, by a processor of an apparatus, a cyclic shift delay (CSD) index assignment in distributing a plurality of subcarriers of a resource unit (RU) over a bandwidth to generate an extremely-high-throughput short training field (EHT-STF) of a distributed-tone RU (dRU); and
transmitting, by the processor, symbols of the EHT-STF of the dRU,
wherein the CSD index assignment is based on a dRU hierarchical structure with one or more CSD indexes shared among multiple dRUs of different sizes but not among multiple dRUs of a same size,
wherein the applying of the CSD index assignment comprises applying the CSD index assignment for a maximum number of spatial streams (maxNss) equal to 16 or 8 in one of a plurality of scenarios,
wherein a CSD start index of the apparatus is calculated using a modulo operation expressed as: CSD start index=mod (AID12, maxNss), with AID12 denoting 12 least significant bits of an association identifier (AID) of the apparatus in accordance with Institute of Electrical and Electronic Engineers (IEEE) specifications,
wherein, in a first scenario of the plurality of scenarios, with the maxNss being 16 and the bandwidth being 20 MHz:
for a 26-tone dRU (dRU26), a per-dRU26 CSD starting index comprises one of [1 3 5 7 8 9 11 13 15],
for a 52-tone dRU (dRU52), a per-dRU52 CSD starting index comprises one of [1 5 9 13], and
for a 106-tone dRU (dRU106), a per-dRU106 CSD starting index comprises one of [1 9], wherein, in a second scenario of the plurality of scenarios, with the maxNss being 16 and the bandwidth being 40 MHz:
for the dRU26, the per-dRU26 CSD starting index comprises one of [1 2 3 4 4 5 6 7 8 9 10 11 12 12 13 14 15 16],
for the dRU52, the per-dRU52 CSD starting index comprises one of [1 3 5 7 9 11 13 15],
for the dRU106, the per-dRU106 CSD starting index comprises one of [1 5 9 13], and
for a 242-tone dRU (dRU242), a per-dRU242 CSD starting index comprises one of [1 9],
wherein, in a third scenario of the plurality of scenarios, with the maxNss being 16 and the bandwidth being 80 MHz:
for the dRU52, the per-dRU52 CSD starting index comprises one of [1 2 3 4 5 6 7 8 9 10 11 12 13 14 15 16],
for the dRU106, the per-dRU106 CSD starting index comprises one of [1 3 5 7 9 11 13 15],
for the dRU242, the per-dRU242 CSD starting index comprises one of [1 5 9 13], and
for a 484-tone dRU (dRU484), a per-dRU484 CSD starting index comprises one of [1 9],
wherein, in a fourth scenario of the plurality of scenarios, with the maxNss being 8 and the bandwidth being 20 MHz:
for the dRU26, the per-dRU26 CSD starting index comprises one of [1 2 3 4 5 5 6 7 8],
for the dRU52, the per-dRU52 CSD starting index comprises one of [2 4 6 8], and
for the dRU106, the per-dRU106 CSD starting index comprises one of [3 7],
wherein, in a fifth scenario of the plurality of scenarios, with the maxNss being 8 and the bandwidth being 40 Mhz:
for the dRU26, the per-dRU26 CSD starting index comprises one of [1 5 2 6 3 3 7 4 8 1 5 2 6 7 3 7 4 8],
for the dRU52, the per-dRU52 CSD starting index comprises one of [1 2 3 4 5 6 7 8],
for the dRU106, the per-dRU106 CSD starting index comprises one of [2 4 6 8], and
for the dRU242, the per-dRU242 CSD starting index comprises one of [3 7],
wherein, in a sixth scenario of the plurality of scenarios, with the maxNss being 8 and the bandwidth being 80 MHz:
for the dRU52, the per-dRU52 CSD starting index comprises one of [1 5 2 6 3 7 4 8 1 5 2 6 3 7 4 8],
for the dRU106, the per-dRU106 CSD starting index comprises one of [1 2 3 4 5 6 7 8],
for the dRU242, the per-dRU242 CSD starting index comprises one of [2 4 6 8], and
for the dRU484, the per-dRU484 CSD starting index comprises one of [3 7],
wherein, in a seventh scenario of the plurality of scenarios, with the maxNss being 8 and the bandwidth being 20 MHz:
for the dRU26, the per-dRU26 CSD starting index comprises one of [1 2 3 4 4 5 6 7 8],
for the dRU52, the per-dRU52 CSD starting index comprises one of [1 3 5 7], and for the dRU106, the per-dRU106 CSD starting index comprises one of [1 6],
wherein, in an eighth scenario of the plurality of scenarios, with the maxNss being 8 and the bandwidth being 40 MHz:
for the dRU26, the per-dRU26 CSD starting index comprises one of [1 2 3 4 1 5 6 7 8 1 2 3 4 4 5 6 7 8],
for the dRU52, the per-dRU52 CSD starting index comprises one of [1 3 5 7 2 4 6 8]
for the dRU106, the per-dRU106 CSD starting index comprises one of [1 5 2 6], and
for the dRU242, the per-dRU242 CSD starting index comprises one of [1 6],
wherein, in a ninth scenario of the plurality of scenarios, with the maxNss being 8 and the bandwidth being 80 MHz:
for the dRU52, the per-dRU52 CSD starting index comprises one of [1 2 3 4 5 6 7 8 1 2 3 4 5 6 7 8],
for the dRU106, the per-dRU106 CSD starting index comprises one of [1 3 5 7 2 4 6 8],
for the dRU242, the per-dRU242 CSD starting index comprises one of [1 5 2 6], and
for the dRU484, the per-dRU484 CSD starting index comprises one of [1 6],
wherein, in a tenth scenario of the plurality of scenarios, with the maxNss being 8 and the bandwidth being 20 MHz:
for the dRU26, the per-dRU26 CSD starting index comprises one of [1 4 5 8 4 2 3 6 7],
for the dRU52, the per-dRU52 CSD starting index comprises one of [1 5 3 7], and
for the dRU106, the per-dRU106 CSD starting index comprises one of [1 7],
wherein, in an eleventh scenario of the plurality of scenarios, with the maxNss being 8 and the bandwidth being 40 MHz:
for the dRU26, the per-dRU26 CSD starting index comprises one of [1 2 3 4 2 5 6 7 8 1 2 3 4 6 5 6 7 8],
for the dRU52, the per-dRU52 CSD starting index comprises one of [1 4 5 8 2 3 6 7]
for the dRU106, the per-dRU106 CSD starting index comprises one of [1 5 3 7], and
for the dRU242, the per-dRU242 CSD starting index comprises one of [1 7], and
wherein, in a twelfth scenario of the plurality of scenarios, with the maxNss being 8 and the bandwidth being 80 MHz:
for the dRU52, the per-dRU52 CSD starting index comprises one of [1 2 3 4 5 6 7 8 1 2 3 4 5 6 7 8],
for the dRU106, the per-dRU106 CSD starting index comprises one of [1 4 5 8 2 3 6 7],
for the dRU242, the per-dRU242 CSD starting index comprises one of [1 5 3 7], and
for the dRU484, the per-dRU484 CSD starting index comprises one of [1 7].

2. An apparatus, comprising:
a transceiver configured to communicate wirelessly; and
a processor coupled to the transceiver and configured to perform operations comprising:
applying a cyclic shift delay (CSD) index assignment in distributing a plurality of subcarriers of a resource unit (RU) over a bandwidth to generate an extremely-high-throughput short training field (EHT-STF) of a distributed-tone RU (dRU); and
transmitting, via the transceiver, symbols of the EHT-STF of the dRU, wherein the CSD index assignment is based on a dRU hierarchical structure with one or more CSD indexes shared among multiple dRUs of different sizes but not among multiple dRUs of a same size,
wherein the applying of the CSD index assignment comprises applying the CSD index assignment for a maximum number of spatial streams (maxNss) equal to 16 or 8 in one of a plurality of scenarios, wherein a CSD start index of the apparatus is calculated using a modulo operation expressed as: CSD start index=mod (AID12, maxNss), with AID12 denoting 12 least significant bits of an association identifier (AID) of the apparatus in accordance with Institute of Electrical and Electronic Engineers (IEEE) specifications, wherein, in a first scenario of the plurality of scenarios, with the maxNss being 16 and the bandwidth being 20 MHz:

for a 26-tone dRU (dRU26), a per-dRU26 CSD starting index comprises one of [1 3 5 7 8 9 11 13 15], for a 52-tone dRU (dRU52), a per-dRU52 CSD starting index comprises one of [1 5 9 13], and for a 106-tone dRU (dRU106), a per-dRU106 CSD starting index comprises one of [1 9], wherein, in a second scenario of the plurality of scenarios, with the maxNss being 16 and the bandwidth being 40 MHz:

for the dRU26, the per-dRU26 CSD starting index comprises one of [1 2 3 4 4 5 6 7 8 9 10 11 12 12 13 14 15 16], for the dRU52, the per-dRU52 CSD starting index comprises one of [1 3 5 7 9 11 13 15], for the dRU106, the per-dRU106 CSD starting index comprises one of [1 5 9 13], and for a 242-tone dRU (dRU242), a per-dRU242 CSD starting index comprises one of [1 9], wherein, in a third scenario of the plurality of scenarios, with the maxNss being 16 and the bandwidth being 80 MHz:

for the dRU52, the per-dRU52 CSD starting index comprises one of [1 2 3 4 5 6 7 8 9 10 11 12 13 14 15 16], for the dRU106, the per-dRU106 CSD starting index comprises one of [1 3 5 7 9 11 13 15], for the dRU242, the per-dRU242 CSD starting index comprises one of [1 5 9 13], and for a 484-tone dRU (dRU484), a per-dRU484 CSD starting index comprises one of [1 9], wherein, in a fourth scenario of the plurality of scenarios, with the maxNss being 8 and the bandwidth being 20 MHz:

for the dRU26, the per-dRU26 CSD starting index comprises one of [1 2 3 4 5 5 6 7 8], for the dRU52, the per-dRU52 CSD starting index comprises one of [2 4 6 8], and for the dRU106, the per-dRU106 CSD starting index comprises one of [3 7], wherein, in a fifth scenario of the plurality of scenarios, with the maxNss being 8 and the bandwidth being 40 MHz:

for the dRU26, the per-dRU26 CSD starting index comprises one of [1 5 2 6 3 3 7 4 8 1 5 2 6 7 3 7 4 8], for the dRU52, the per-dRU52 CSD starting index comprises one of [1 2 3 4 5 6 7 8], for the dRU106, the per-dRU106 CSD starting index comprises one of [2 4 6 8], and for the dRU242, the per-dRU242 CSD starting index comprises one of [3 7], wherein, in a sixth scenario of the plurality of scenarios, with the maxNss being 8 and the bandwidth being 80 MHz:

for the dRU52, the per-dRU52 CSD starting index comprises one of [1 5 2 6 3 7 4 8 1 5 2 6 3 7 4 8], for the dRU106, the per-dRU106 CSD starting index comprises one of [1 2 3 4 5 6 7 8], for the dRU242, the per-dRU242 CSD starting index comprises one of [2 4 6 8], and for the dRU484, the per-dRU484 CSD starting index comprises one of [3 7], wherein, in a seventh scenario of the plurality of scenarios, with the maxNss being 8 and the bandwidth being 20 MHz:

for the dRU26, the per-dRU26 CSD starting index comprises one of [1 2 3 4 4 5 6 7 8], for the dRU52, the per-dRU52 CSD starting index comprises one of [1 3 5 7], and for the dRU106, the per-dRU106 CSD starting index comprises one of [1 6], wherein, in an eighth scenario of the plurality of scenarios, with the maxNss being 8 and the bandwidth being 40 MHz:

for the dRU26, the per-dRU26 CSD starting index comprises one of [1 2 3 4 1 5 6 7 8 1 2 3 4 4 5 6 7 8], for the dRU52, the per-dRU52 CSD starting index comprises one of [1 3 5 7 2 4 6 8], for the dRU106, the per-dRU106 CSD starting index comprises one of [1 5 2 6], and for the dRU242, the per-dRU242 CSD starting index comprises one of [1 6], wherein, in a ninth scenario of the plurality of scenarios, with the maxNss being 8 and the bandwidth being 80 MHz:

for the dRU52, the per-dRU52 CSD starting index comprises one of [1 2 3 4 5 6 7 8 1 2 3 4 5 6 7 8], for the dRU106, the per-dRU106 CSD starting index comprises one of [1 3 5 7 2 4 6 8], for the dRU242, the per-dRU242 CSD starting index comprises one of [1 5 2 6], and for the dRU484, the per-dRU484 CSD starting index comprises one of [1 6], wherein, in a tenth scenario of the plurality of scenarios, with the maxNss being 8 and the bandwidth being 20 MHz:

for the dRU26, the per-dRU26 CSD starting index comprises one of [1 4 5 8 4 2 3 6 7], for the dRU52, the per-dRU52 CSD starting index comprises one of [1 5 3 7], and for the dRU106, the per-dRU106 CSD starting index comprises one of [1 7], wherein, in an eleventh scenario of the plurality of scenarios, with the maxNss being 8 and the bandwidth being 40 MHz:

for the dRU26, the per-dRU26 CSD starting index comprises one of [1 2 3 4 2 5 6 7 8 1 2 3 4 6 5 6 7 8], for the dRU52, the per-dRU52 CSD starting index comprises one of [1 4 5 8 2 3 6 7], for the dRU106, the per-dRU106 CSD starting index comprises one of [1 5 3 7], and for the dRU242, the per-dRU242 CSD starting index comprises one of [1 7], and wherein, in a twelfth scenario of the plurality of scenarios, with the maxNss being 8 and the bandwidth being 80 MHz:

for the dRU52, the per-dRU52 CSD starting index comprises one of [1 2 3 4 5 6 7 8 1 2 3 4 5 6 7 8], for the dRU106, the per-dRU106 CSD starting index comprises one of [1 4 5 8 2 3 6 7], for the dRU242, the per-dRU242 CSD starting index comprises one of [1 5 3 7], and for the dRU484, the per-dRU484 CSD starting index comprises one of [1 7].

* * * * *